(12) United States Patent
Novick

(10) Patent No.: US 7,096,382 B2
(45) Date of Patent: Aug. 22, 2006

(54) SYSTEM AND A METHOD FOR ASYNCHRONOUS REPLICATION FOR STORAGE AREA NETWORKS

(75) Inventor: Yoram Novick, Haifa (IL)

(73) Assignee: Topio, Inc., Wilmington, DE (US)

( * ) Notice: Subject to any disclaimer, the term of this patent is extended or adjusted under 35 U.S.C. 154(b) by 542 days.

(21) Appl. No.: 10/090,488

(22) Filed: Mar. 4, 2002

(65) Prior Publication Data

US 2002/0133737 A1 Sep. 19, 2002

Related U.S. Application Data

(60) Provisional application No. 60/272,782, filed on Mar. 5, 2001.

(51) Int. Cl.
*G06F 11/00* (2006.01)
(52) U.S. Cl. .................. 714/20; 714/4; 714/6; 370/394
(58) Field of Classification Search ............ 714/4, 714/20, 18, 6, 120; 370/394; 707/204
See application file for complete search history.

(56) References Cited

U.S. PATENT DOCUMENTS

| | | | |
|---|---|---|---|
| 5,446,871 A | 8/1995 | Shomler et al. ............ 714/1 |
| 5,504,883 A | 4/1996 | Coverston et al. ......... 707/202 |
| 5,577,222 A | 11/1996 | Micka et al. ............... 711/112 |
| 5,734,818 A | 3/1998 | Kern et al. .................... 714/20 |
| 5,737,600 A | 4/1998 | Geiner et al. .............. 707/200 |
| 6,065,018 A * | 5/2000 | Beier et al. ................ 707/202 |
| 6,148,383 A | 11/2000 | Micka et al. ............... 711/162 |
| 6,202,135 B1 * | 3/2001 | Kedem et al. ............. 711/162 |
| 6,246,684 B1 * | 6/2001 | Chapman et al. .......... 370/394 |
| 6,269,431 B1 * | 7/2001 | Dunham .................... 711/162 |
| 6,289,355 B1 * | 9/2001 | Haderle et al. ............ 707/200 |
| 6,301,643 B1 * | 10/2001 | Crockett et al. ........... 711/162 |
| 6,324,654 B1 * | 11/2001 | Wahl et al. .................... 714/6 |
| 6,463,501 B1 * | 10/2002 | Kern et al. ................. 711/100 |
| 6,549,988 B1 * | 4/2003 | Gertner ...................... 711/141 |
| 6,658,540 B1 * | 12/2003 | Sicola et al. ............... 711/162 |
| 6,658,590 B1 * | 12/2003 | Sicola et al. ................... 714/6 |
| 6,732,124 B1 * | 5/2004 | Koseki et al. ............. 707/202 |
| 6,781,992 B1 * | 8/2004 | Rana et al. ................. 370/394 |
| 2004/0078399 A1 * | 4/2004 | Tabuchi et al. ............ 707/204 |

* cited by examiner

*Primary Examiner*—Robert Beausoliel
*Assistant Examiner*—Christopher McCarthy
(74) *Attorney, Agent, or Firm*—Ladas and Parry LLP

(57) ABSTRACT

A data backup and recovery system for use with at least one server interconnected with at least one storage device, including at least one data recovery device, at least one associated data recovery storage device, controlled by the data recovery device, and at least one data communication monitor. A method for data backup and recovery is also disclosed.

136 Claims, 19 Drawing Sheets

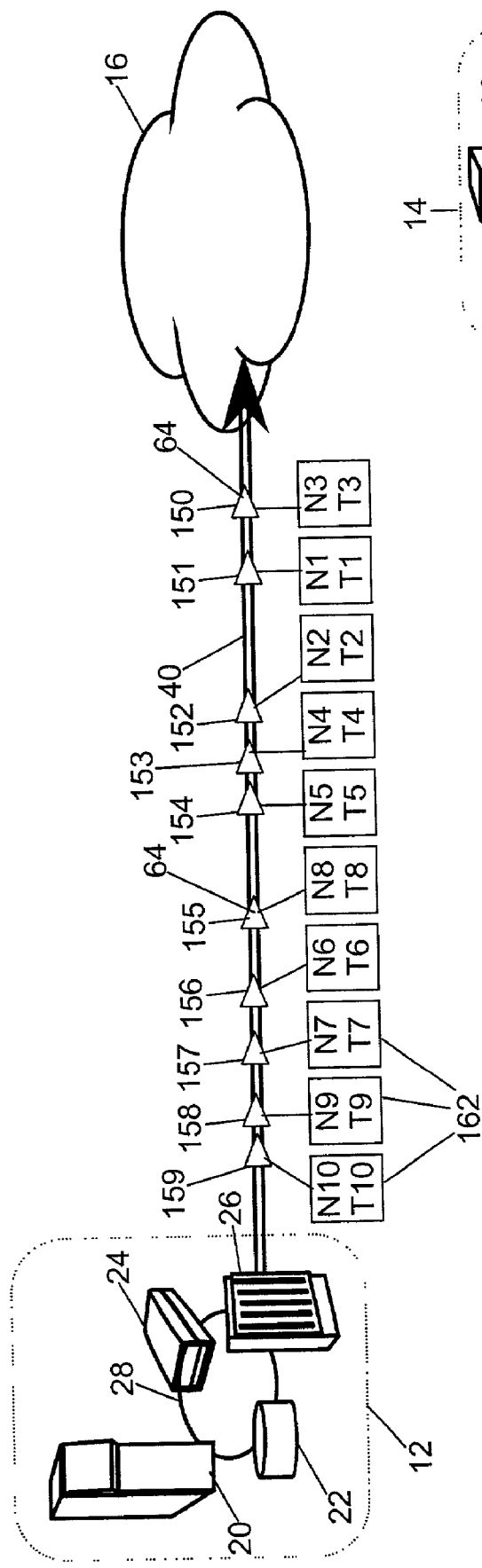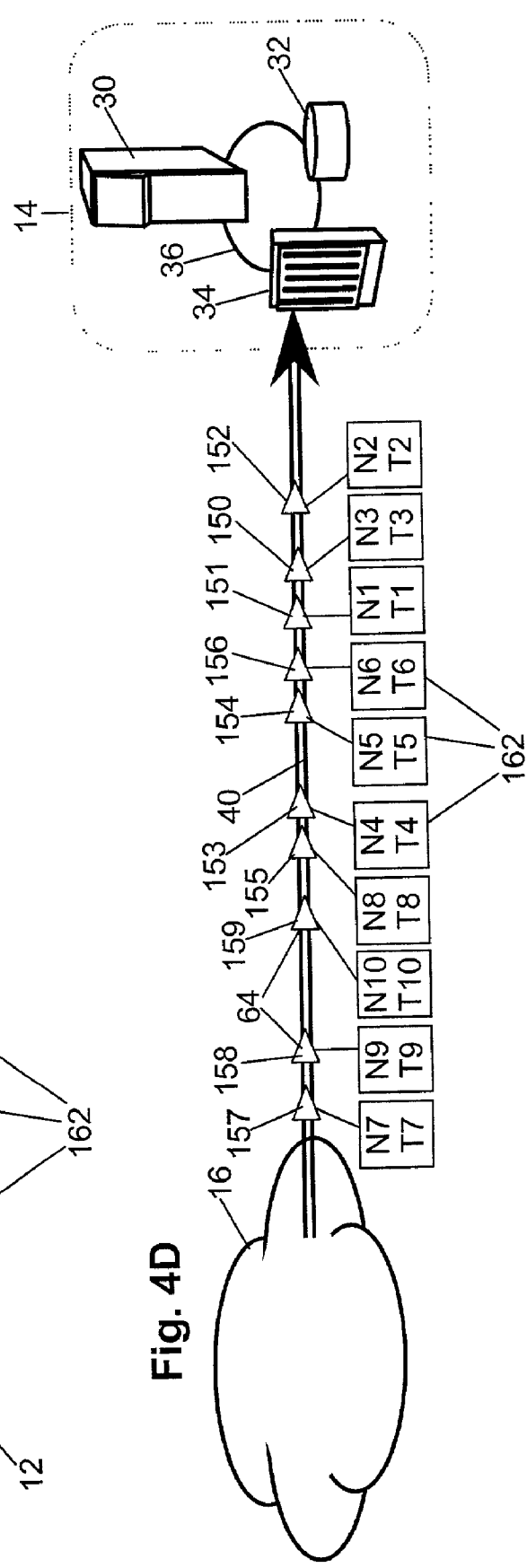
Fig. 4C
Fig. 4D

SYSTEM AND A METHOD FOR ASYNCHRONOUS REPLICATION FOR STORAGE AREA NETWORKS

REFERENCE TO CO-PENDING APPLICATION

Applicant hereby claims priority of U.S. Provisional Patent Application Ser. No. U.S. Ser. No. 60/272,782, filed Mar. 5, 2001, entitled "A SYSTEM AND A METHOD FOR ASYNCHRONOUS REPLICATION FOR STORAGE AREA NETWORKS".

REFERENCE TO COMPUTER PROGRAM LISTING APPENDIX

A computer program listing appendix is submitted herewith on one compact disc and one duplicate compact disc. The total number of compact discs including duplicates is two. The files on the compact discs are software object code for carrying out the preferred embodiment of the invention.

Their names, dates of creation, directory locations, and sizes in bytes of the compact disc are:

42541.hex of Feb. 28, 2002 located in the root folder and of length 124,437,726 bytes.

The files are referred to herein as Appendix 1. The material on the compact discs is incorporated by reference herein.

FIELD OF THE INVENTION

The present invention relates to systems and methods for backup and recovery of information used with geographically dispersed information processing environments.

BACKGROUND OF THE INVENTION

The following U.S. Pat. Nos. are believed to represent the current state of the art:

6,148,383; 5,734,818; 5,577,222 and 5,446,871.

SUMMARY OF THE INVENTION

The present invention seeks to provide improved systems and methods for backup and recovery of data for geographically dispersed information processing environments and storage area networks.

There is thus provided in accordance with a preferred embodiment of the present invention a data backup and recovery system for use with at least one server interconnected with at least one storage device, the data backup and recovery system including at least one data recovery device, at least one data recovery storage device associated with and controlled by the at least one data recovery device and at least one data communication monitor for providing to the at least one data recovery device at least control information bearing an order stamp regarding data communications between corresponding ones of the at least one server and the at least one storage device, the at least one data recovery device being responsive to at least the control information bearing an order stamp for storing data on the at least one data recovery storage device in a manner which enables reconstruction of a representation of the data communications at a given earlier time but does not require that the data be sent to the at least one data recovery device in a given order or stored on the at least one data recovery storage device in a given order.

There is also provided in accordance with a preferred embodiment of the present invention a data backup and recovery system for use with at least one server interconnected with at least one storage device, the data backup and recovery system including at least one data recovery device, at least one data recovery storage device associated with and controlled by the at least one data recovery device and data communication monitors for providing to the at least one data recovery device at least control information bearing an order stamp regarding data communications between corresponding ones of the at least one server and the at least one storage device, the at least one data recovery device being operative to receive the at least control information and to store data on the at least one data recovery storage device in parallel and not requiring that the data be received by the at least one data recovery device in a given order.

There is further provided in accordance with a preferred embodiment of the present invention a method for data backup and recovery for use with at least one server interconnected with at least one storage device, including providing at least one data recovery device, providing at least one data recovery storage device associated with and controlled by the at least one data recovery device and providing at least one data communication monitor operative to perform monitoring the data communication between the at least one server and the at least one storage device, creating at least control information bearing an order stamp regarding the data communications between corresponding ones of the at least one server and the at least one storage device and sending the monitored data communications and the control information to the at least one data recovery device, the at least one data recovery device responding to the at least control information in a manner which enables reconstruction of a representation of the data communications at a given earlier time but not requiring that the sending the monitored data communications and the control information to the at least one data recovery device be in a given order or stored on the at least one data recovery storage device in a given order.

There is yet further provided in accordance with a preferred embodiment of the present invention a method for data backup and recovery for use with at least one server interconnected with at least one storage device, including providing at least one data recovery device, providing at least one data recovery storage device associated with and controlled by the at least one data recovery device, providing at least one data communication monitor operative to perform monitoring the data communication between the at least one server and the at least one storage device, creating at least control information bearing an order stamp regarding the data communications between corresponding ones of the at least one server and the at least one storage device and sending the monitored data communications and the control information to the at least one data recovery device, receiving the at least control information by the at least one data recovery device, and storing the data on the at least one data recovery storage device in parallel and without requiring that the data be received by the at least one data recovery device in a given order.

Preferably, the data communication monitors are located other than only at the at least one storage device.

In accordance with a preferred embodiment of the present invention, the data communication monitors also provide at least part of the data communications to the at least one data recovery device.

Preferably, the at least one data recovery device is operative to receive the at least control information and to store data on the at least one data recovery storage device in parallel.

In accordance with a preferred embodiment of the present invention the data communications comprise data updates.

In accordance with another preferred embodiment of the present invention, the reconstruction of a representation of the data communications at a given earlier time guarantees that if the order stamp of a first update is smaller than the order stamp of a second update, the second update is not stored on the at least one data recovery storage device unless the first update is stored on the at least one data recovery storage device.

Preferably, the data communication monitors are associated with individual ones of the at least one server. Alternatively, the data communication monitors are associated with network elements of a storage area network.

In accordance with a preferred embodiment of the present invention, at least one of the control information and the data communications is communicated from the data communication monitors to the data recovery device via a network. Preferably, the network is a private network. Alternatively, the network is a public network. Alternatively, at least one of the control information and the data communications is communicated from the data communication monitors to the data recovery device via a storage area network.

In accordance with another preferred embodiment of the present invention, the data communication monitors provide at least part of the data communications to the at least one data recovery storage device other than via the at least one data recovery device.

In accordance with yet another preferred embodiment of the present invention, the data backup and recovery system also includes at least one LOG storage device wherein the at least one LOG storage device includes at least control information bearing a time mark regarding data communications between corresponding ones of the first plurality of servers and the plurality of storage devices via the storage area network. Preferably, the data communication monitors also store at least part of the data communications to the at least one LOG storage device. Additionally, the data communications stored to the at least one LOG storage device include data updates sent by the first plurality of servers to the second plurality of storage devices.

In accordance with still another preferred embodiment of the present invention, the data backup and recovery system has at least one storage device LOG such that if either the control information or the data communications, or both, are prematurely erased from the at least one data recovery device due to a failure or other event, the at least one data recovery device restores either the control information or the data communications, or both, from the at least one storage device LOG. Additionally, the at least one data recovery device resumes its activities with the restored data from the at least one storage device LOG.

Preferably, the at least one data recovery device retrieves the at least part of the data communications from the at least one storage device LOG for the purpose of storing the data to at least one data recovery storage device associated therewith in the time ordered manner.

In accordance with yet another preferred embodiment of the present invention, the at least part of the data communications is communicated from the data communication monitors to the at least one storage device LOG via a network. Preferably, the network is a private network. Alternatively, the network is a public network. In accordance with another preferred embodiment, the at least part of the data communications is communicated from the data communication monitors to the at least one storage device LOG via the storage area network.

In accordance with yet another preferred embodiment, the at least one data recovery device retrieves both the control information and the at least part of the data communications from at least one storage device LOG for the purpose of storing the data to at least one data recovery storage device associated therewith in the time ordered manner.

In accordance with yet another preferred embodiment of the present invention, both the control information and the at least part of the data communications are communicated from the data communication monitors to the at least one storage device LOG via a network. Preferably, the network is a private network. Alternatively, the network is a public network. In another preferred embodiment, both the control information and the at least part of the data communications are communicated from the data communication monitors to the at least one storage device LOG via the storage area network.

Preferably, the reconstruction includes sending the data communications from the at least one data recovery storage device to the at least one storage device. Additionally, the reconstruction includes employing the at least one data backup and recovery system as at least one of the at least one server and the at least one storage device.

In accordance with another preferred embodiment, the at least one server and the at least one storage device are interconnected via a local area network (LAN). Alternatively, the at least one server and the at least one storage device are interconnected via a storage area network (SAN).

In accordance with still another preferred embodiment, the at least one storage device is a network attached storage (NAS) device.

In accordance with another preferred embodiment, the at least one data communication monitor monitors data communications between the at least one server and the at least one storage device over the LAN. Alternatively, the at least one data communication monitor monitors data communications between the at least one server and the at least one storage device over the SAN.

Preferably, the at least one server includes the at least one data communication monitor. Alternatively, the at least one storage device includes the at least one data communication monitor.

In accordance with another preferred embodiment, the SAN includes the at least one data communication monitor.

BRIEF DESCRIPTION OF THE DRAWINGS AND APPENDIX

The present invention will be understood and appreciated more fully from the following detailed description, taken in conjunction with the drawings in which.

Figure 3A:
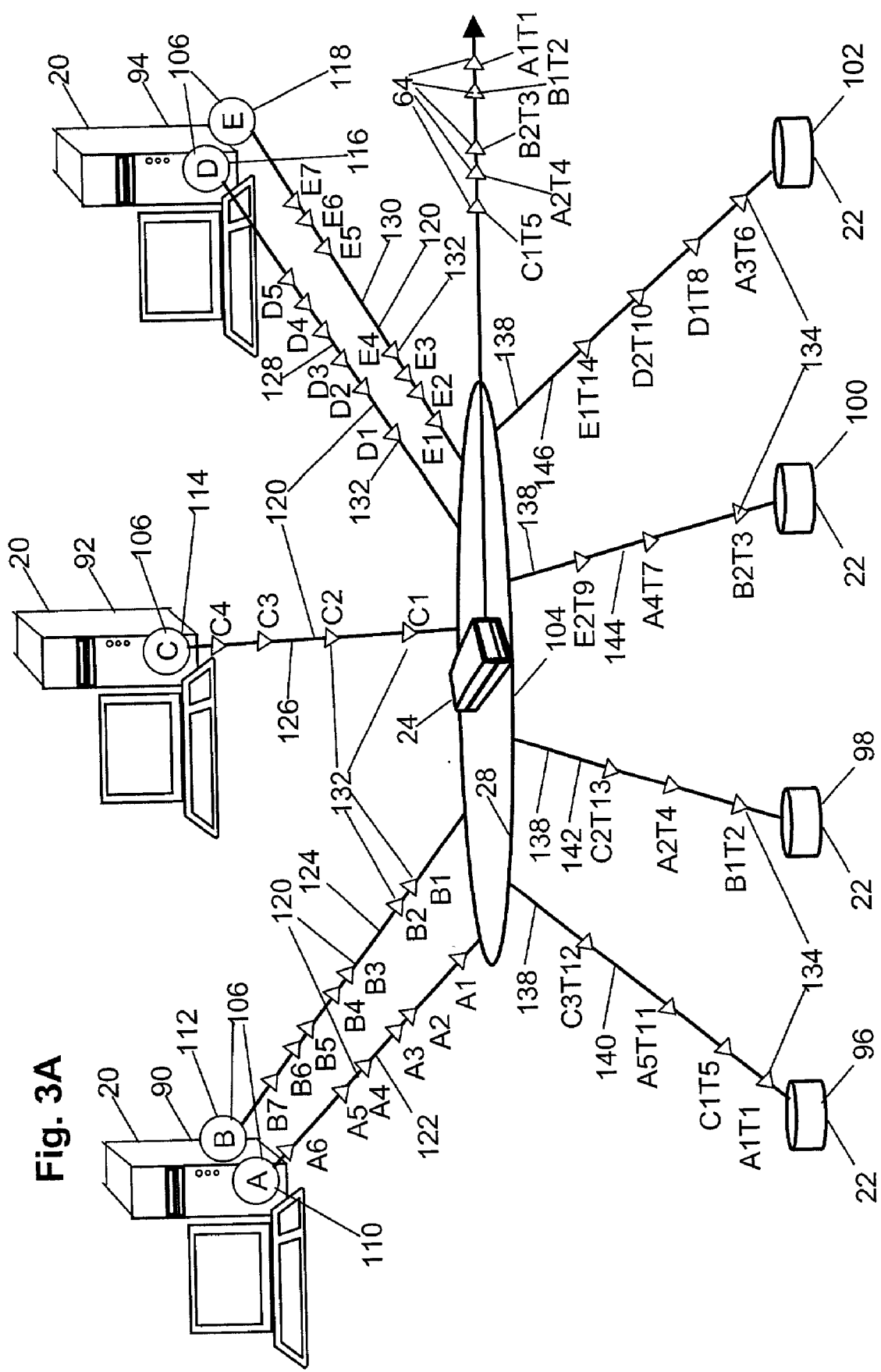
FIGS. 3A and 3B are simplified illustrations of flow of backup data in a data backup and recovery system and method constructed and operative in accordance with preferred embodiments of the present invention.
Figure 4A:
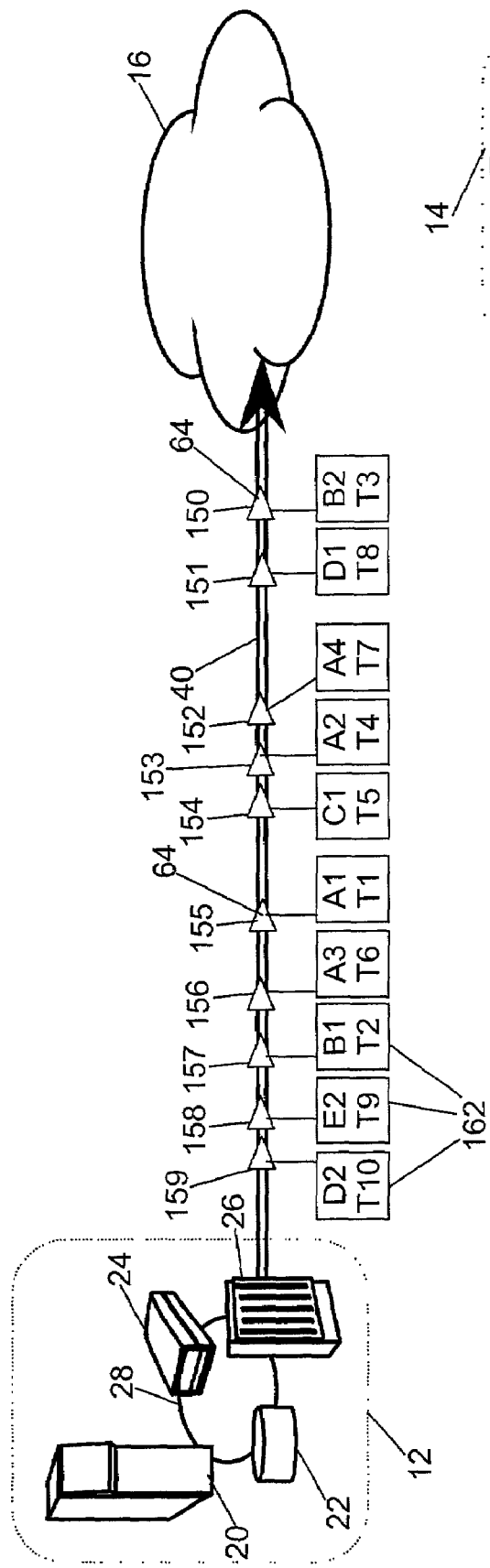
Figure 4B:
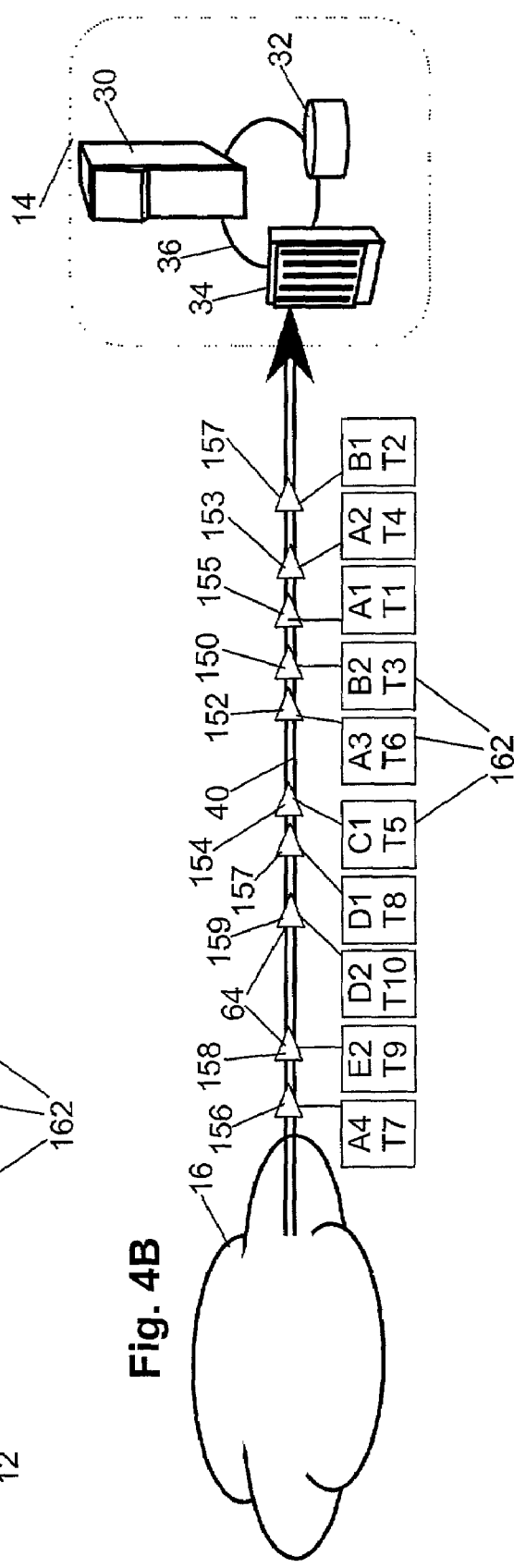
Figure 5:
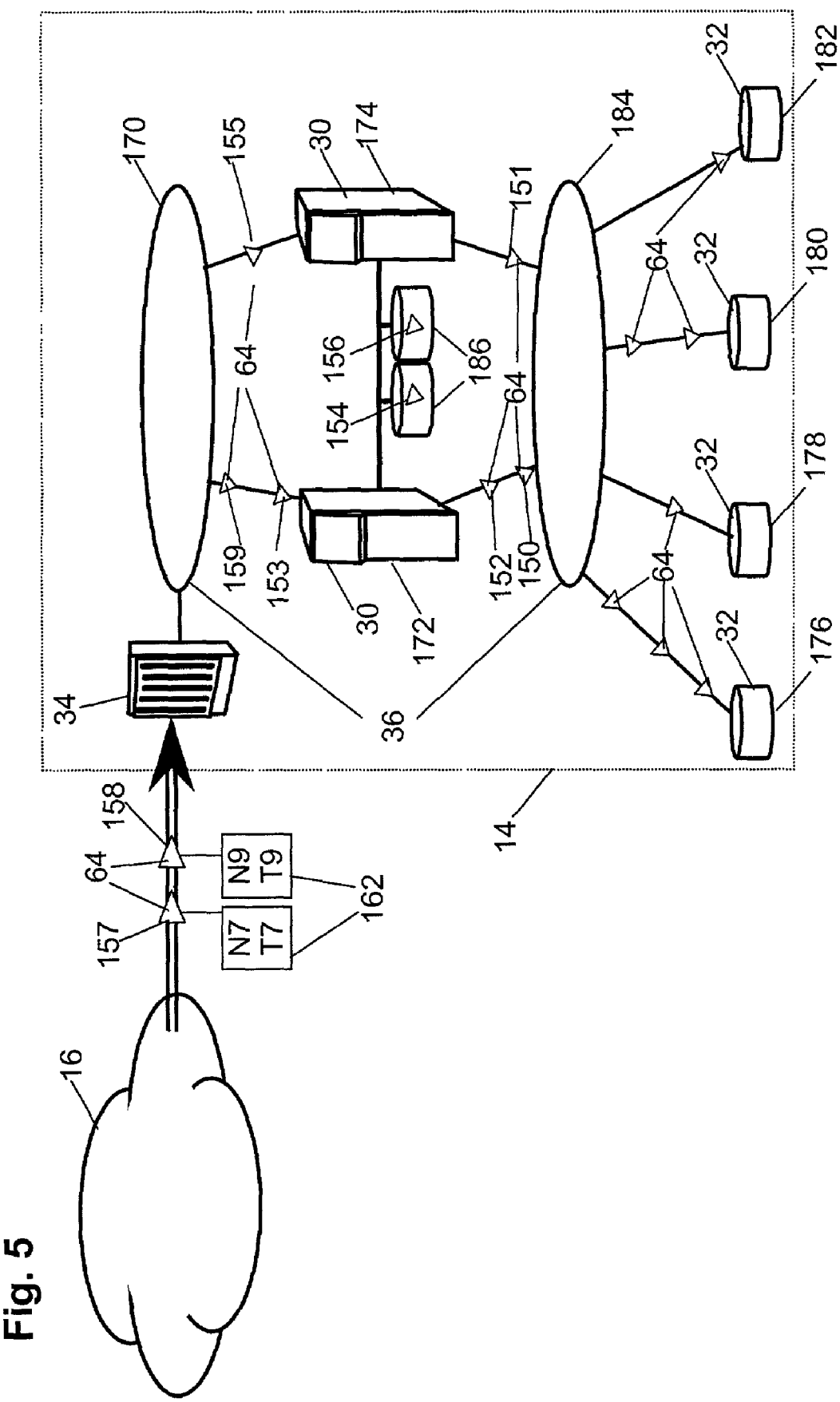
Figure 6:
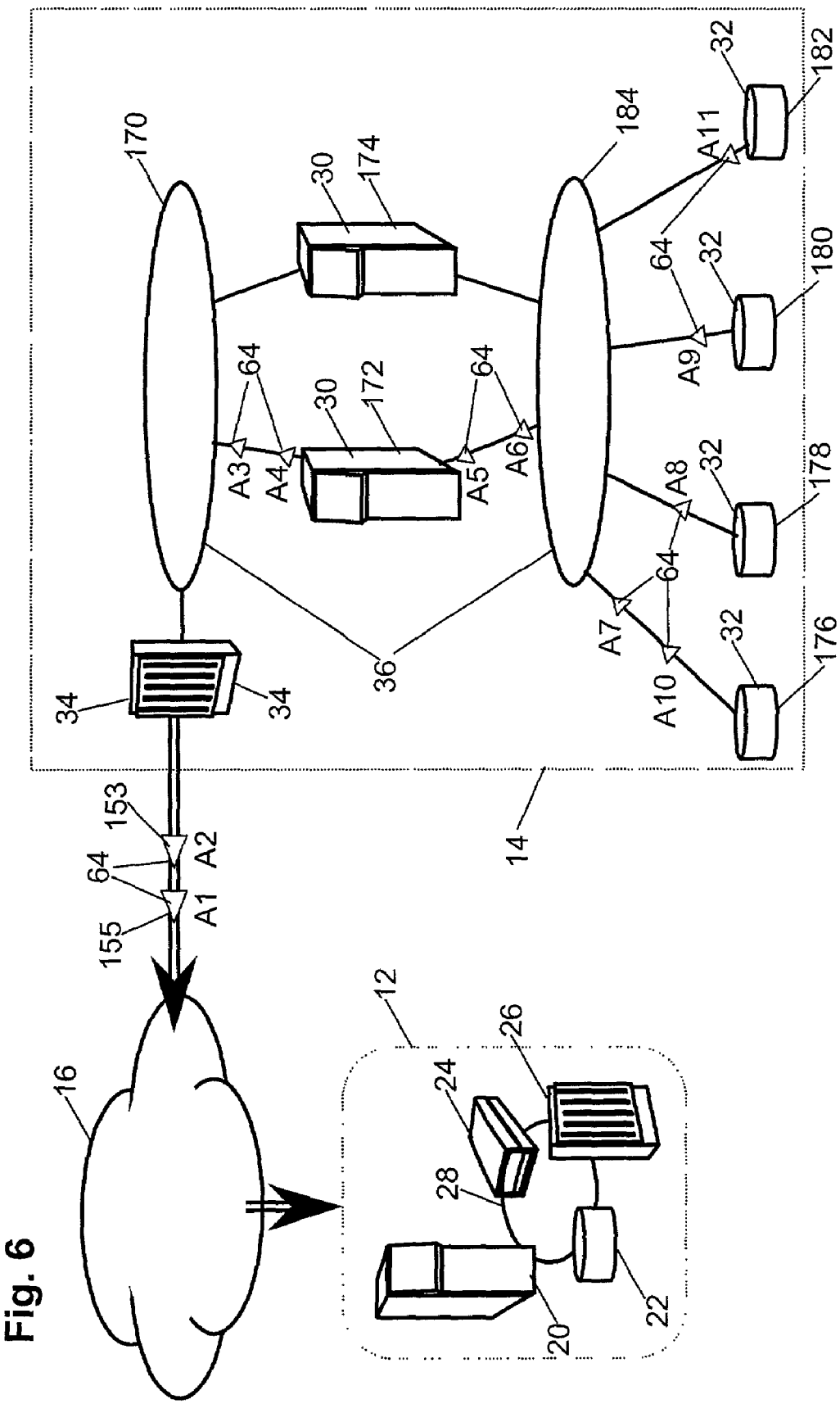
Figure 7:
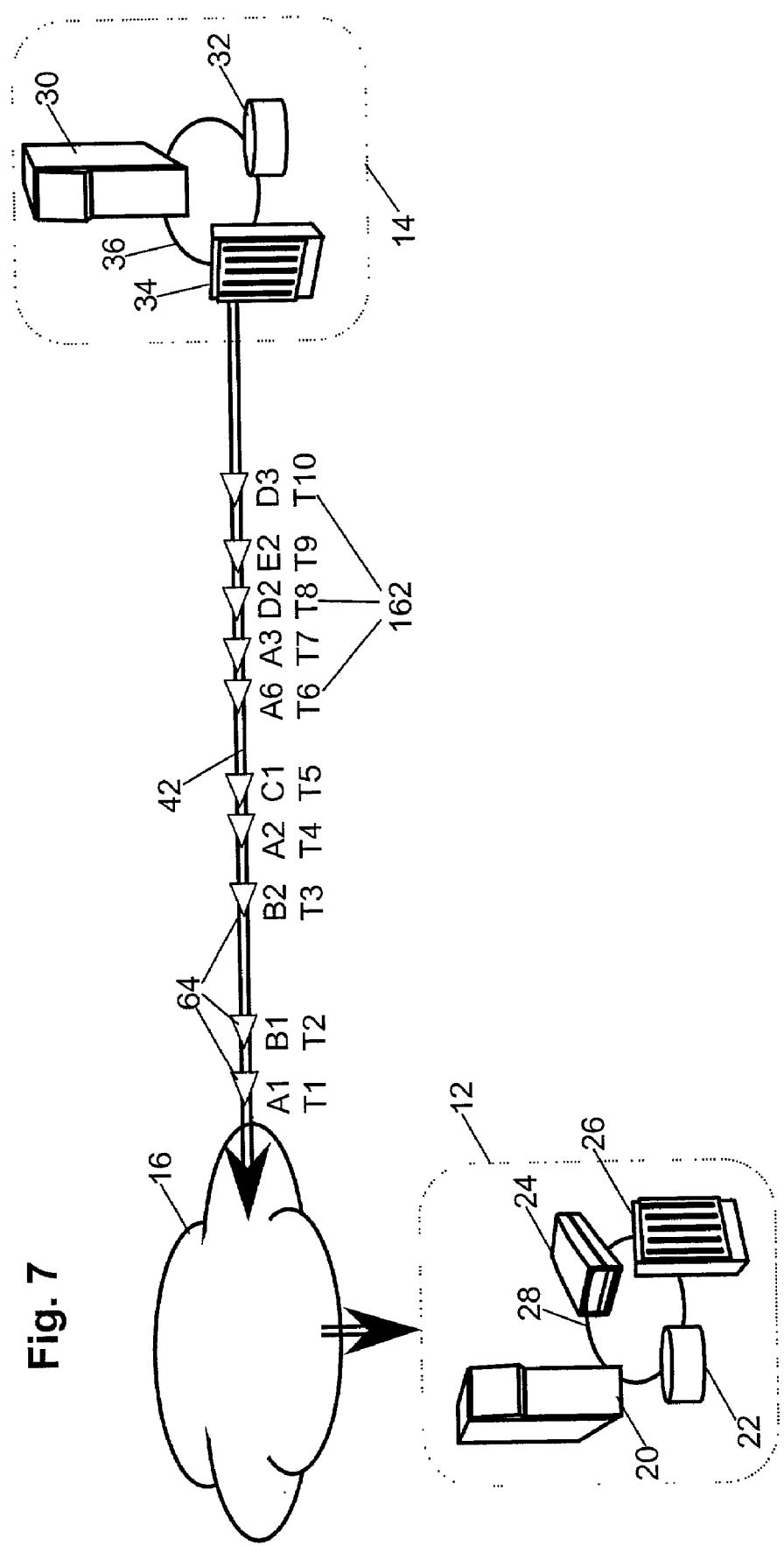
Figure 8:
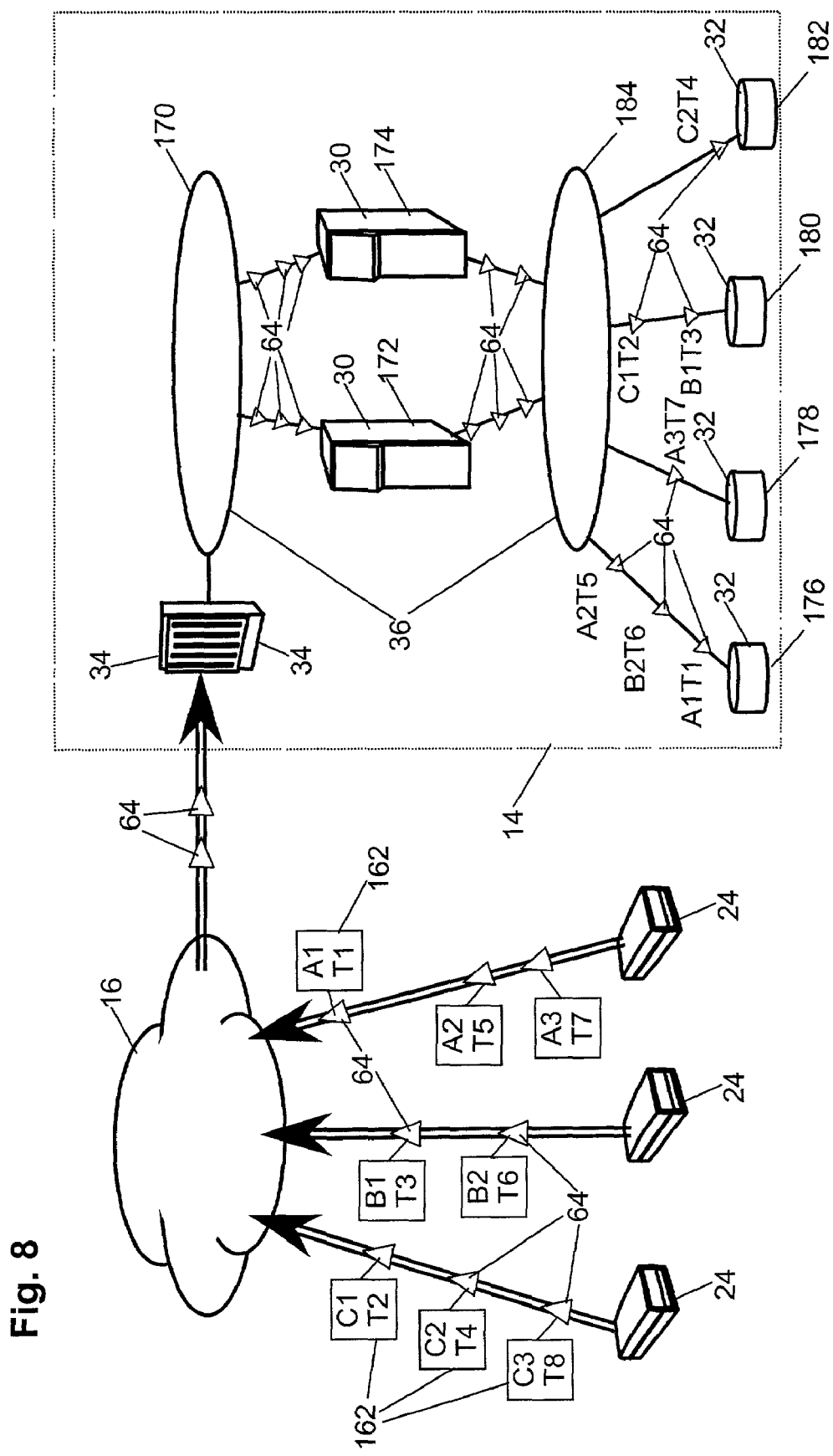
Figure 9:
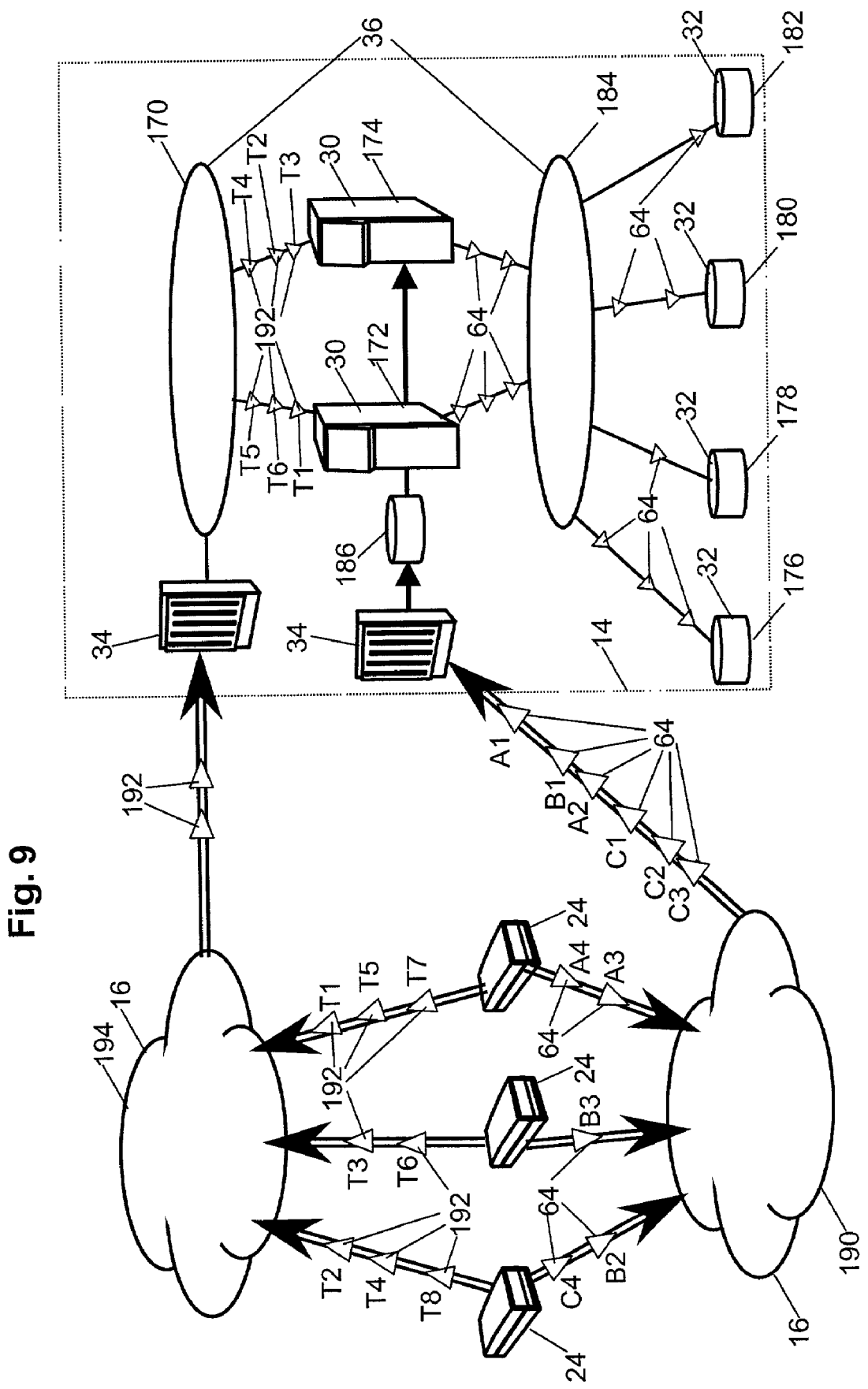
Figure 10A:
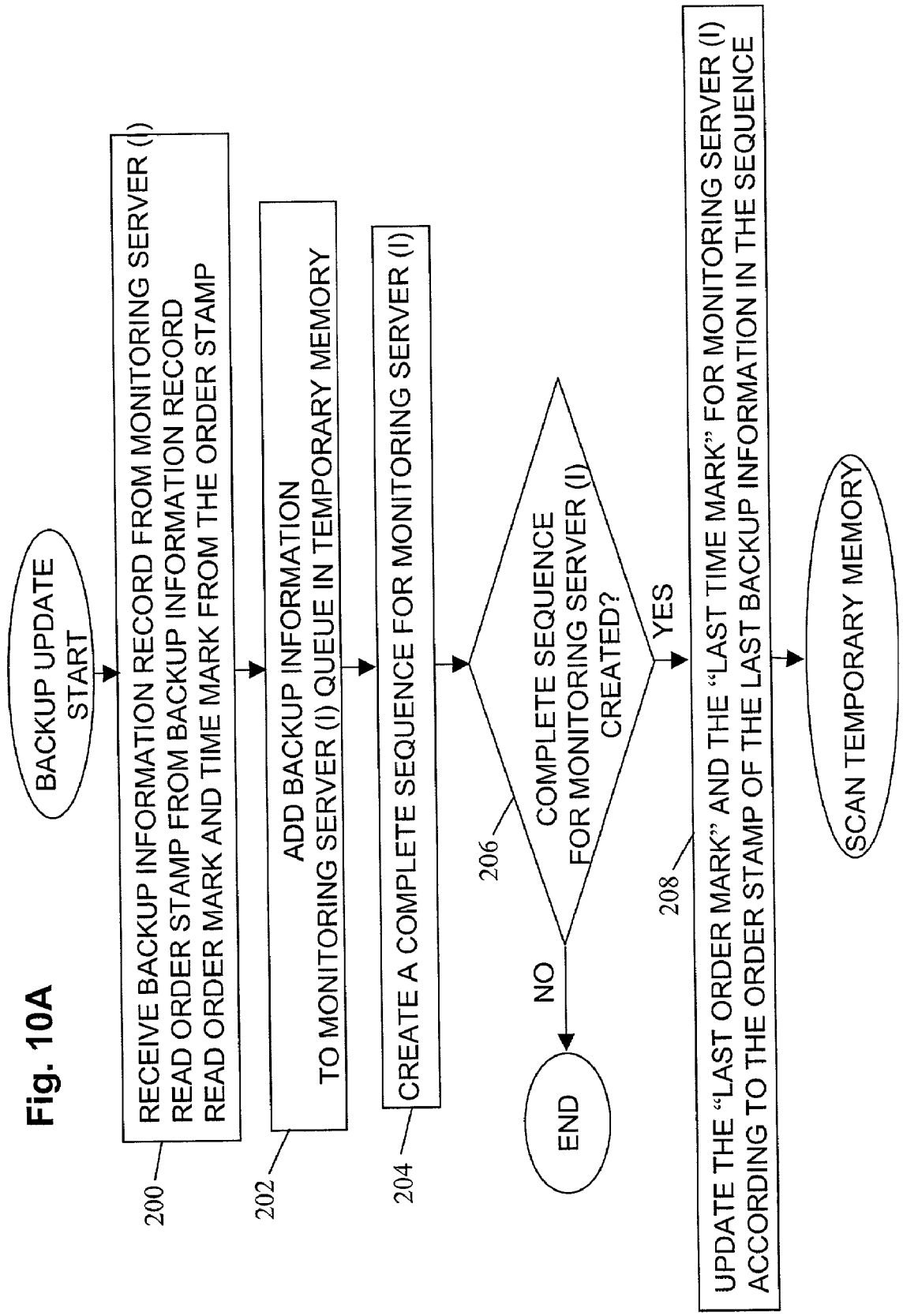
Figure 10B:
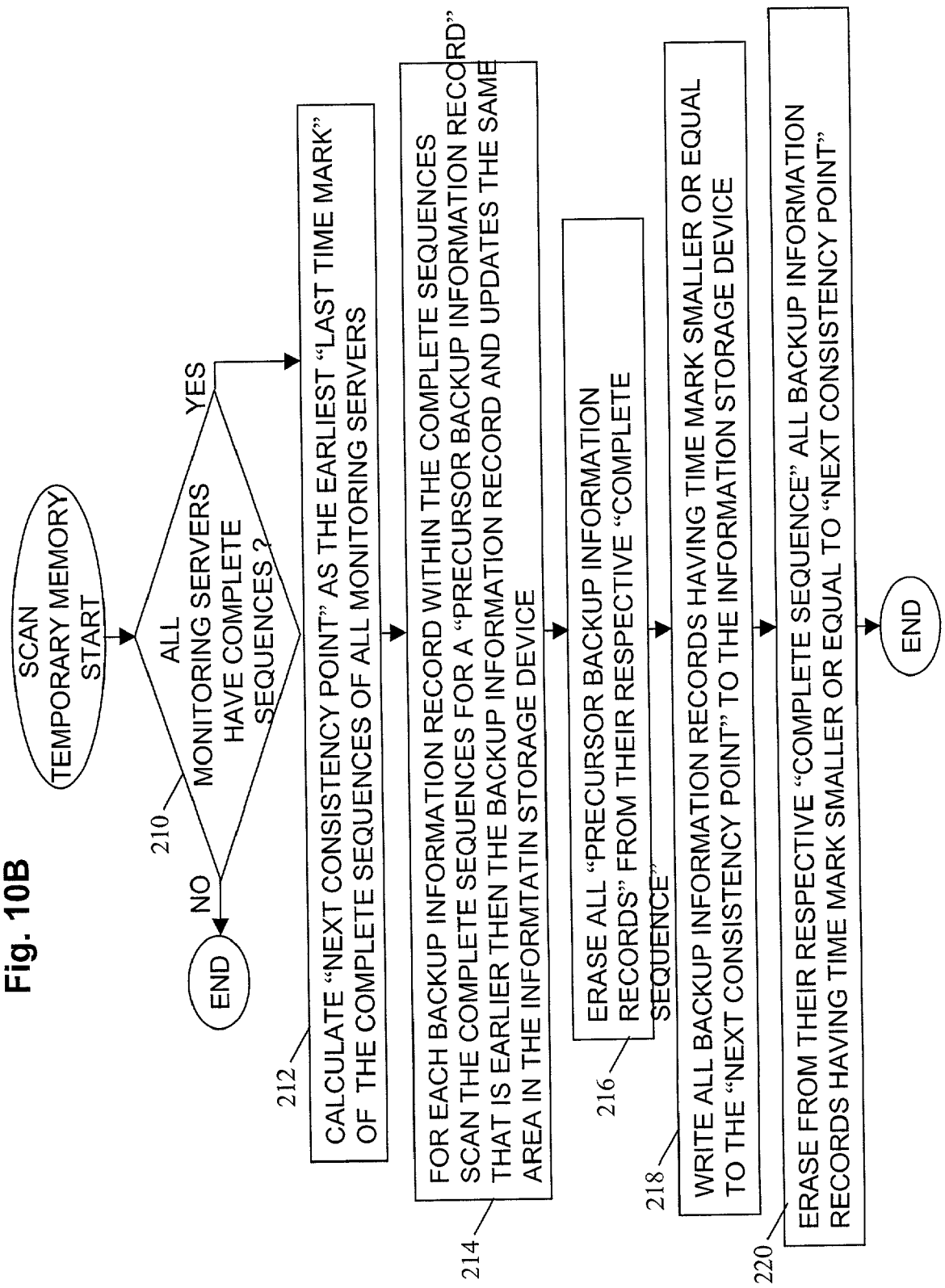

FIGS. 4A and 4B, taken together, are a simplified illustration of the flow of backup data within a data backup and recovery system and method constructed and operative in accordance with the embodiment shown in FIG. 3A;

FIGS. 4C and 4D, taken together, are a simplified illustration of the flow of backup data within a data backup and recovery system and method constructed and operative in accordance with another embodiment of the present invention;

FIG. 5 is a simplified illustration of flow of backup data within a data backup and recovery system and method constructed and operative in accordance with another embodiment of the present invention;

FIG. 6 is a simplified illustration of flow of recovery data within a data backup and recovery system and method constructed and operative in accordance with a preferred embodiment of the present invention;

FIG. 7 is a simplified illustration of flow of recovery data within a data backup and recovery system and method constructed and operative in accordance with a preferred embodiment of the present invention;

FIG. 8 is a simplified illustration of flow of backup information and associated order stamps from a plurality of monitors operative in accordance with a preferred embodiment of the present invention;

FIG. 9 is a simplified illustration of backup information flow and a separate and associated flow of order stamps, from a plurality of information processing sites operative in accordance with a preferred embodiment of the present invention; and FIGS. 10A and 10B, taken together, form a simplified flow chart of a typical procedure for managing the temporary memory of a data backup and recovery system constructed and operative in accordance with a preferred embodiment of the present invention.

APPENDIX LIST

Appendix 1 is a computer listing which forms a preferred software embodiment of the present invention.

DETAILED DESCRIPTION OF PREFERRED EMBODIMENTS

Figure 1:
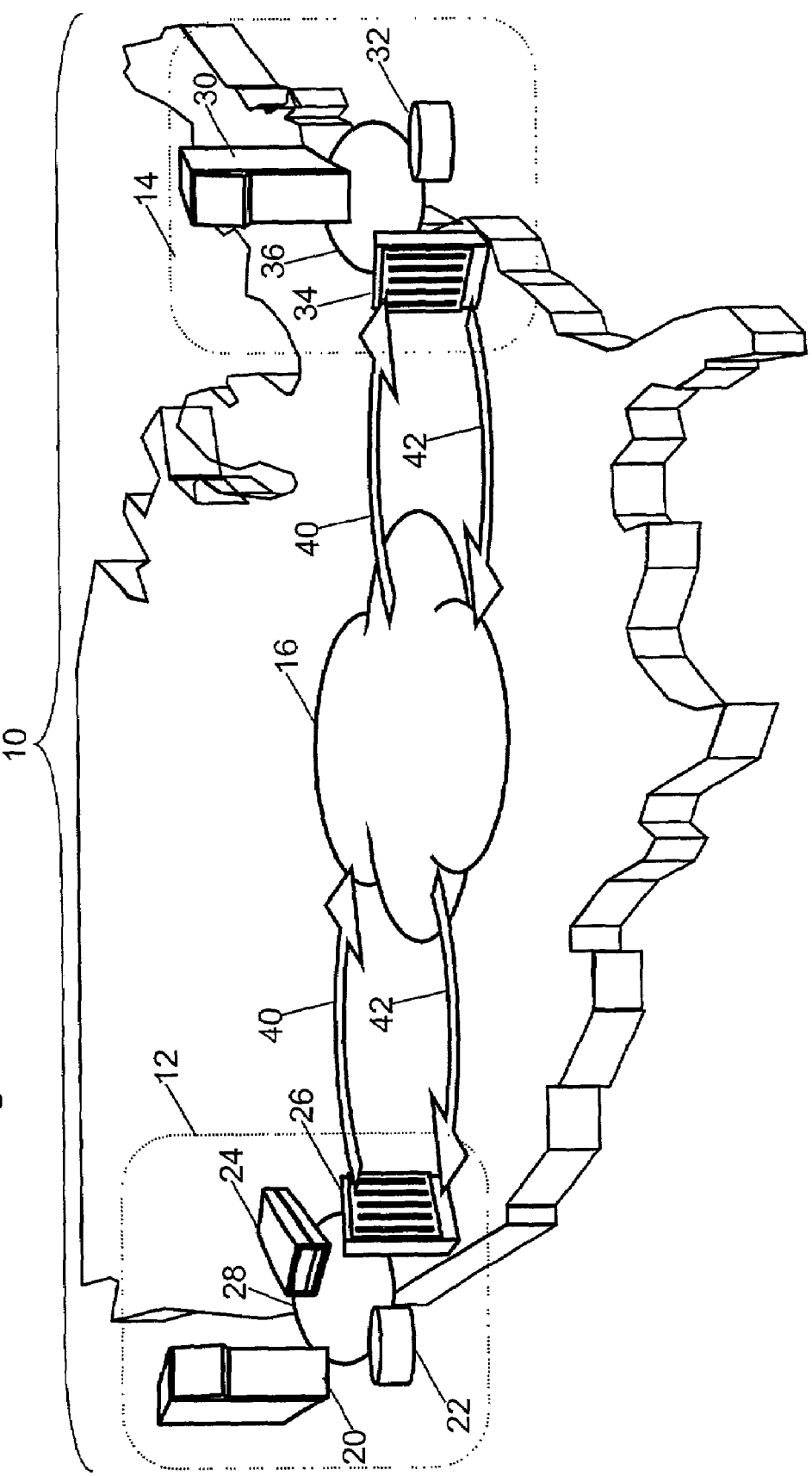
FIG. 1 is a simplified illustration of a data backup and recovery system constructed and operative in accordance with a preferred embodiment of the present invention, operative in a geographically dispersed information processing environment.

Reference is now made to FIG. 1, which is a simplified illustration of a data backup and recovery system constructed and operative in accordance with a preferred embodiment of the present invention, operative in a geographically dispersed information processing environment 10. As seen in FIG. 1, the geographically dispersed information processing environment 10 comprises at least one information processing site 12 and at least one information backup and recovery site 14, typically located at separate geographic locations. The information processing site 12 and the information backup and recovery site 14 are interconnected via interconnection 16, preferably a wide area network (WAN), such as a public services digital network (PSDN).

It is appreciated that the information processing site 12 and the information backup and recovery site 14 may be situated at a single geographic location or a multiplicity of geographically dispersed locations. It is also appreciated that any suitable data communication technology or combination of data communication technologies may be used to interconnect the information processing site 12 with the information backup and recovery site 14 of the information processing environment 10. For example, interconnection 16 may comprise wire line communication facilities as well as wireless communication facilities, including radio communication and satellite communication.

As further seen in FIG. 1, the information processing site 12 preferably comprises at least one information processing device 20, at least one information storage device 22, at least one monitoring server 24 and at least one communication gateway 26. The information processing device 20, the information storage device 22, the monitoring server 24 and the communication gateway 26 are preferably interconnected by interconnection 28, such as a local area network (LAN). As described hereinbelow with reference to FIGS. 2A–2G, interconnection 28 may include one or more interconnections connected to devices in addition to information processing device 20, information storage device 22, monitoring server 24 and communication gateway 26.

The information backup and recovery site 14 preferably comprises at least one information backup and recovery server 30, at least one information storage device 32 and at least one communication gateway 34. The information backup and recovery server 30, the information storage device 32 and the communication gateway 34 are preferably interconnected by interconnection 36, such as a LAN. As described hereinbelow with reference to FIGS. 5, 6, 8 and 9, interconnection 38 may be comprised of one or more interconnections connected to devices in addition to information backup and recovery server 30, information storage device 32 and communication gateway 34.

In accordance with a preferred embodiment of the present invention, the information processing site 12, in particular the monitoring server 24, sends backup information 40, preferably in accordance with embodiments described hereinbelow with reference to FIGS. 3A–4D, to the information backup and recovery site 14. It is appreciated that any suitable communication technology may be used to provide communication between the monitoring servers 24, via the communication gateway 26 and the interconnection 16 to the information backup and recovery site 14.

Recovery of backup information 40, that has been received at the information backup and recovery site 14 from the information processing site 12, is provided for, preferably in accordance with embodiments described hereinbelow with reference to FIGS. 6 & 7, in the event of failure of information processing site 12. Recovery information is sent from the backup and recovery site 14, via the interconnection 16, to the information processing site 12, as indicated by arrows 42. The information structure of information processing site 12, such as files and databases, is recovered from the information received from backup and recovery site 14.

Alternatively, in the event of failure of information processing site 12, the backup and recovery site 14 is used as an information processing site instead of the failed information processing site 12. In an alternative embodiment of the present invention, when part of the information processing site 12 remains functional, portions of the backup and recovery site 14 are configured to work together with the functional portions of information processing site 12. For example, in the event of failure of the storage device 22, the remaining portions of information processing site 12 would be connected via the interconnection 16 to the backup and recovery site 14 that would function as the information storage device 22.

Figure 2A:
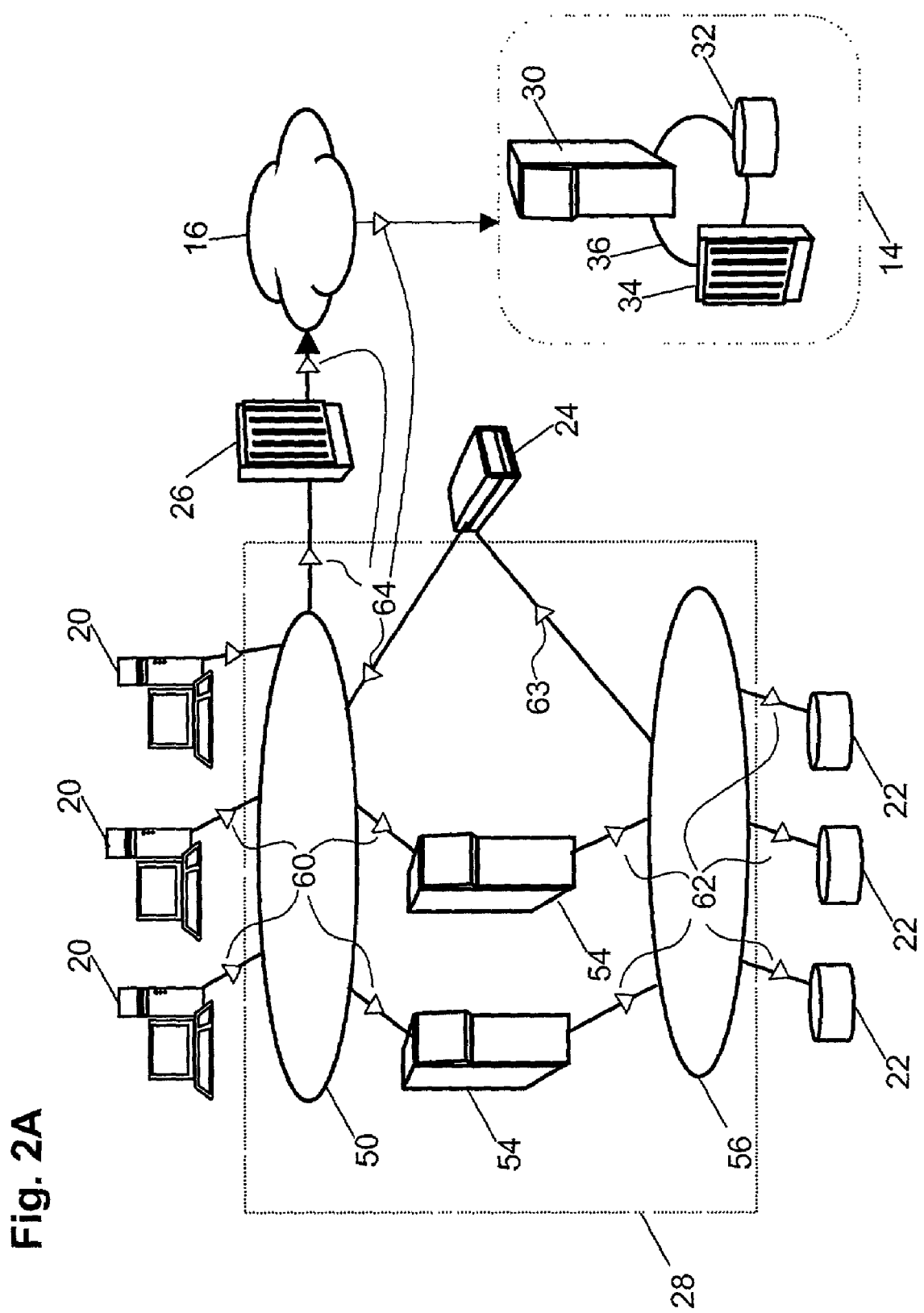
FIGS. 2A, 2B, 2C, 2D, 2E, 2F and 2G are simplified illustrations of alternative embodiments wherein an information processing site communicates backup information in accordance with the present invention.

Reference is now made to FIG. 2A, which is a simplified illustration of a preferred embodiment of an information processing site communicating backup information in accordance with the present invention. As seen in the embodiment of FIG. 2A, the interconnection 28 includes a LAN 50, application servers 54 and a storage area network (SAN) 56, with corresponding communication links to the information processing devices 20, the information storage devices 22, the monitoring server 24 and the communication gateway 26. The communication gateway 26 is connected to the LAN 50, while the monitoring server 24 is connected to both the SAN 56 and the LAN 50.

The information processing devices 20 typically communicate input-and-output (I/O) requests 60, over the LAN 50, to the application servers 54, which, in turn, communicate the corresponding storage I/O requests 62 to the information storage devices 22 via the SAN 56. It is appreciated that the application servers 54 may convert each I/O request 60 into a plurality of storage I/O requests 62. The monitoring server 24 monitors the storage I/O requests 62 over the SAN 56, as indicated by stream of data 63, and sends the corresponding backup information records 64, via the LAN 50, the communication gateway 26 and the interconnection 16, to the information backup and recovery site 14.

Figure 2B:
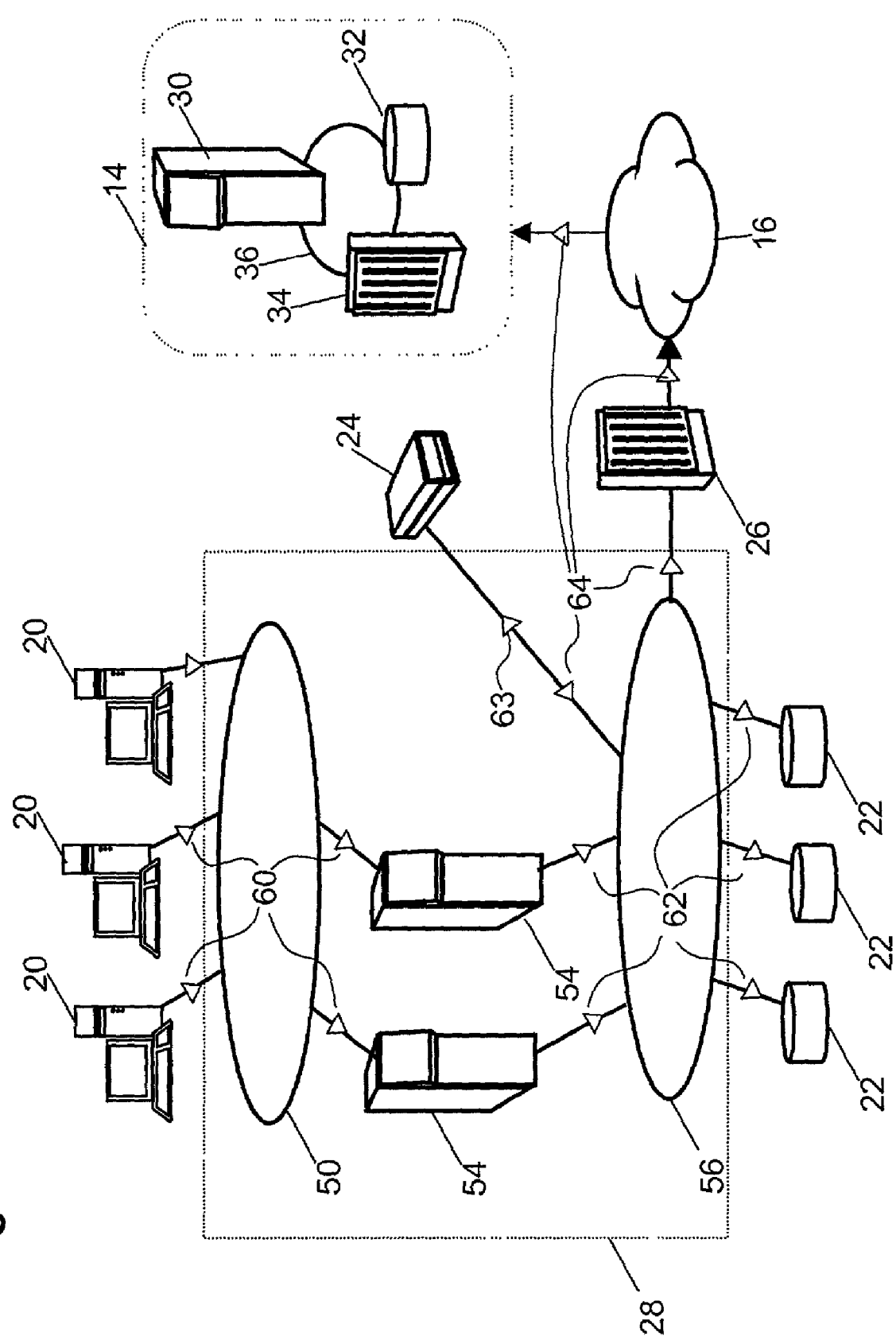

Reference is now made to FIG. 2B, which is a simplified illustration of another preferred embodiment of an information processing site communicating backup information in accordance with the present invention. In the embodiment of FIG. 2B, the monitoring server 24 and the communication gateway 26 are connected to the SAN 56. The monitoring server 24 monitors the storage I/O requests 62, as indicated by element 63, and communicates the corresponding backup information records 64, via the SAN 56, the communication gateway 26 and the interconnection 16, to the information backup and recovery site 14.

Figure 2C:
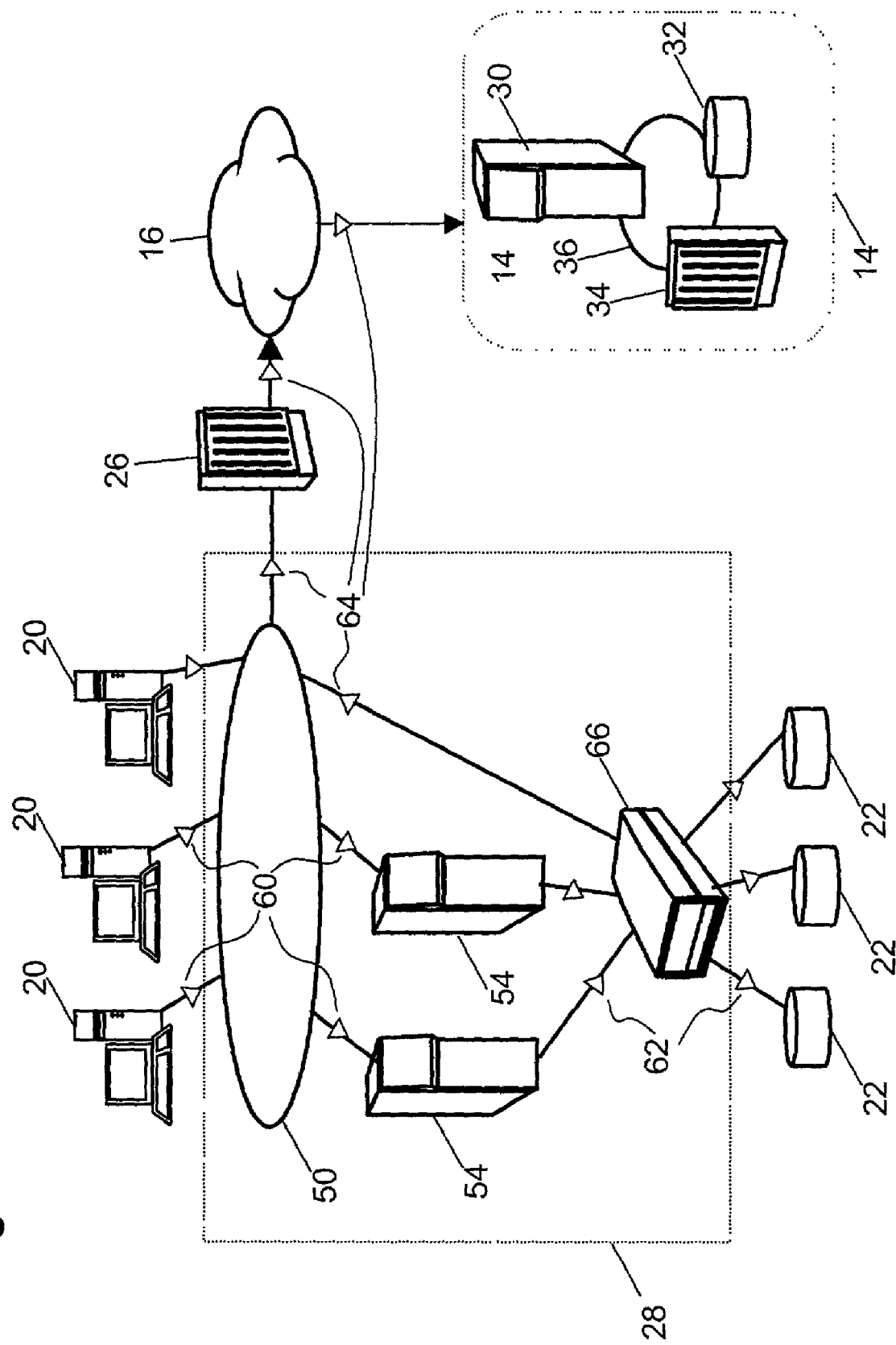

Reference is now made to FIG. 2C, which is a simplified illustration of yet another preferred embodiment of an information processing site communicating backup information in accordance with the present invention. In this embodiment, a storage network switching and monitoring device 66 functions as a storage network switch, or a similar type of network equipment, with an additional functionality of the monitoring server 24. The application servers 54 communicate storage I/O requests 62 to the storage devices 22 via the storage network switching and monitoring device 66. The storage network switching and monitoring device 66 monitors the storage I/O requests 62 and communicates the corresponding backup information records 64, typically via the LAN 50, via the communication gateway 26 and via the interconnection 16, to the information backup and recovery site 14.

Figure 2D:
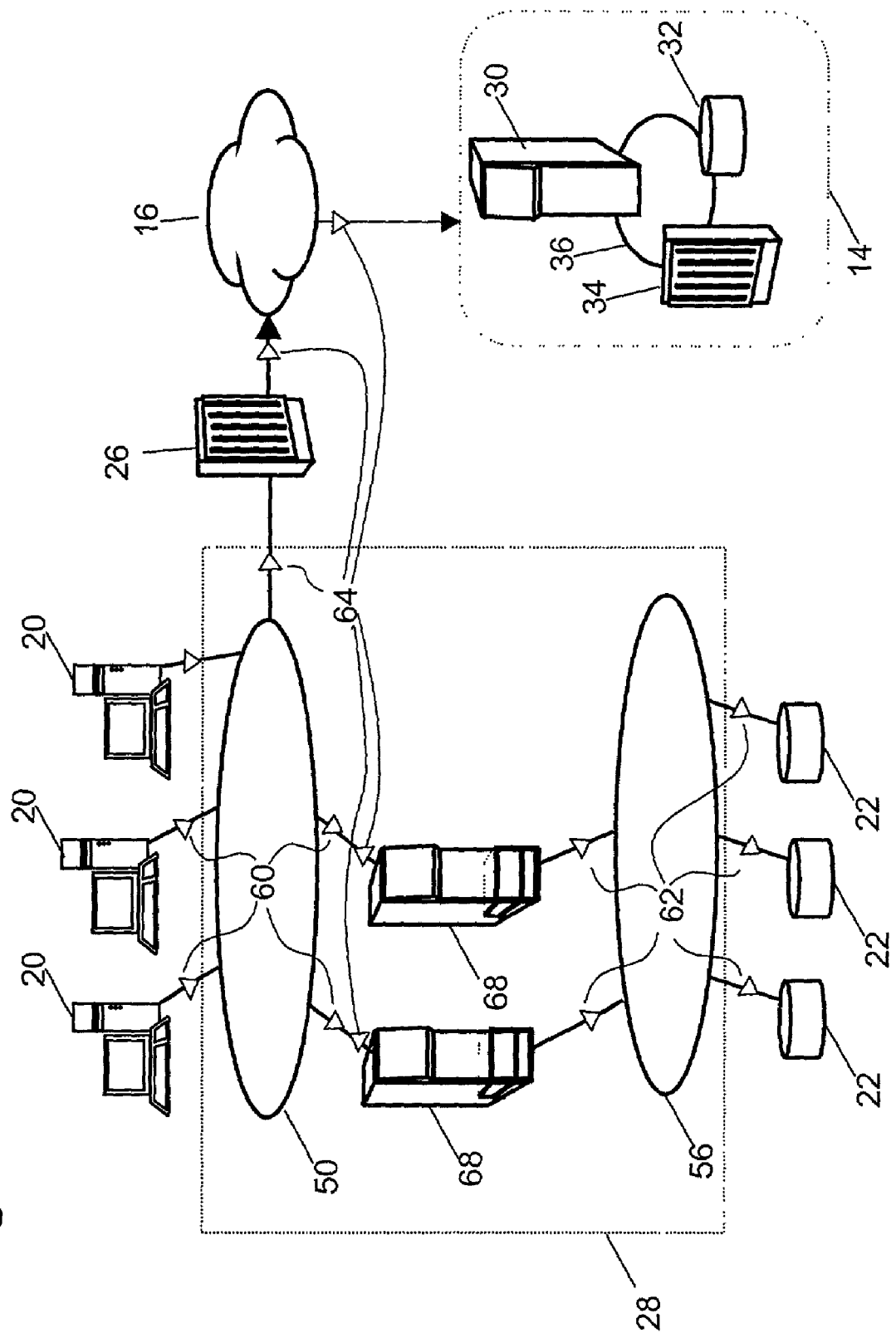

Reference is now made to FIG. 2D, which is a simplified illustration of still another preferred embodiment of the information processing site communicating backup information in accordance with the present invention. As seen in FIG. 2D, application server 68 includes the functionality of the monitoring server 24, typically as a software component. The monitoring server functionality within the application server 68 monitors the I/O requests 60 or 62 and communicates the corresponding backup information records 64, via the LAN 50, the communication gateway 26 and the interconnection 16, to the information backup and recovery site 14.

Figure 2E:
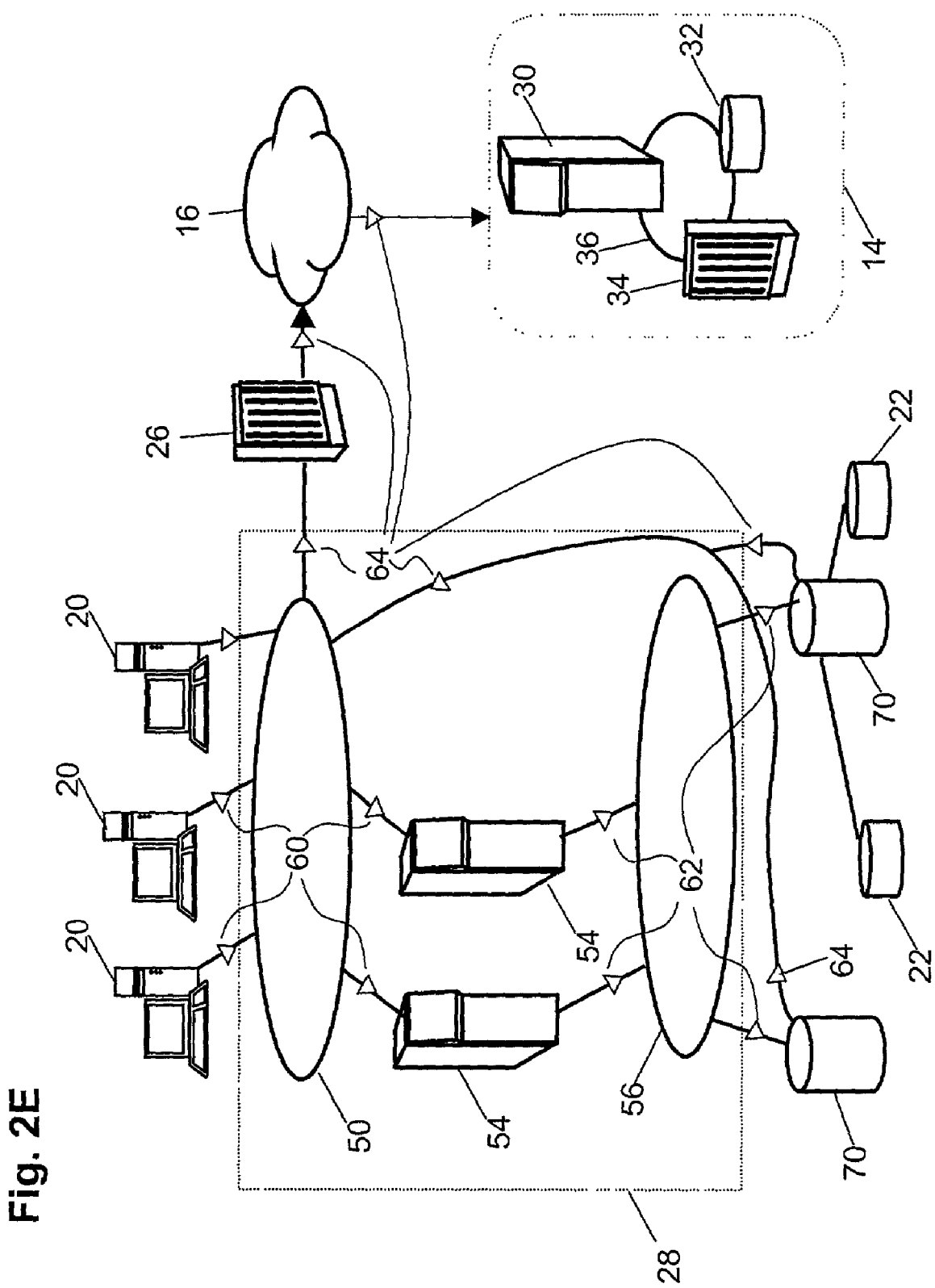

Reference is now made to FIG. 2E, which is a simplified illustration of yet another preferred embodiment of the information processing site communicating backup information in accordance with the present invention. In this embodiment, one or more information storage devices 22 are replaced by monitoring storage devices 70 which include the functionality of a monitoring server and an information storage device. It is appreciated that a monitoring storage device 70 can monitor one or more additional information storage devices 22, as shown. The application servers 54 communicate the storage I/O requests 62 to the monitoring storage devices 70. The monitoring storage devices 70 monitor the storage I/O requests 62 and communicate the corresponding backup information records 64, via the LAN 50, the communication gateway 26 and the interconnection 16, to the information backup and recovery site 14.

Figure 2F:
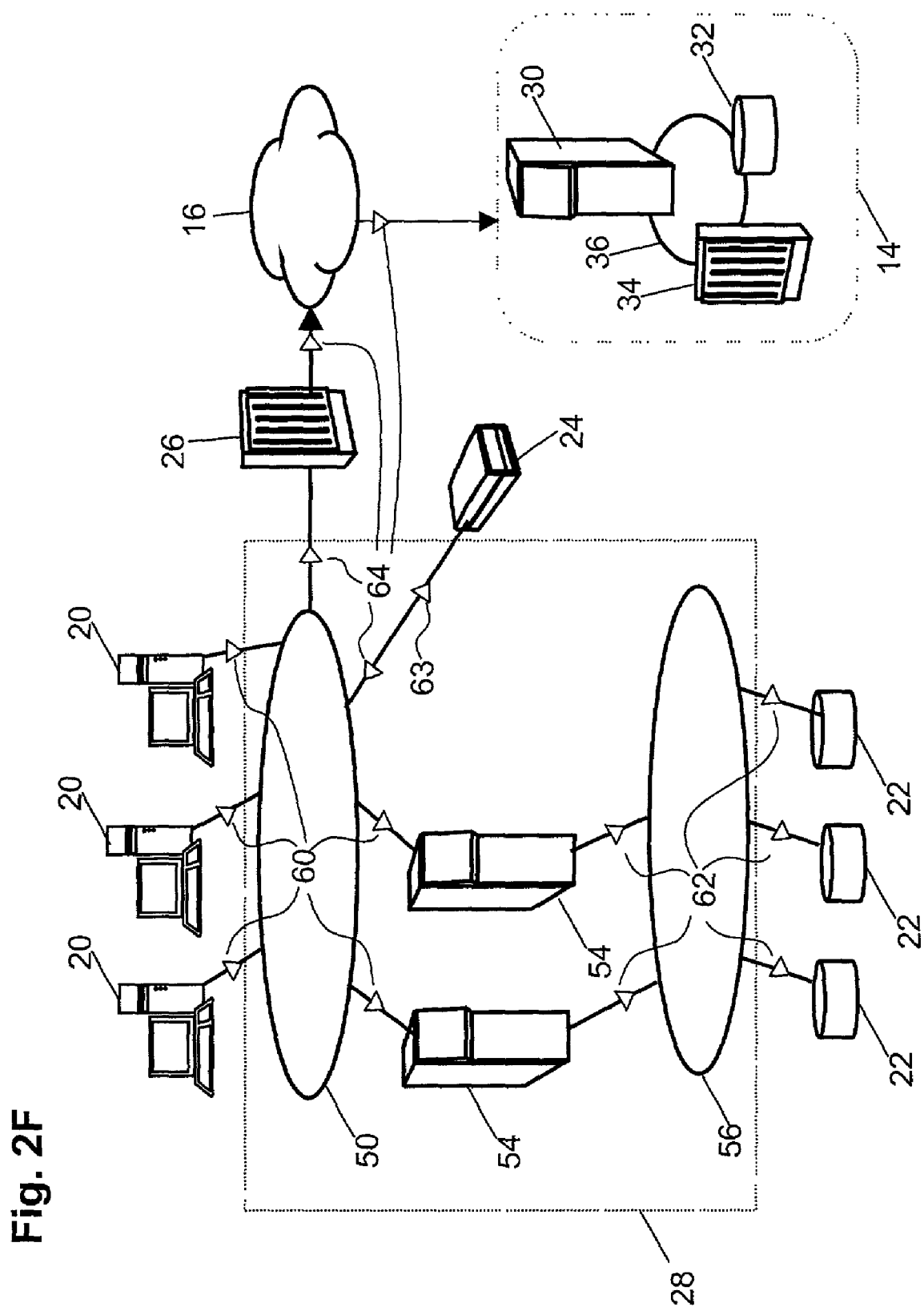

Reference is now made to FIG. 2F, which is a simplified illustration of a further preferred embodiment of the information processing site communicating backup information in accordance with the present invention. As seen in FIG. 2F, the monitoring server 24 monitors the I/O requests 60 over the LAN 50, as indicated by element 63, and sends the corresponding backup information records 64, via the LAN 50, the communication gateway 26 and the interconnection 16, to the remote information backup and recovery site 14.

Figure 2G:
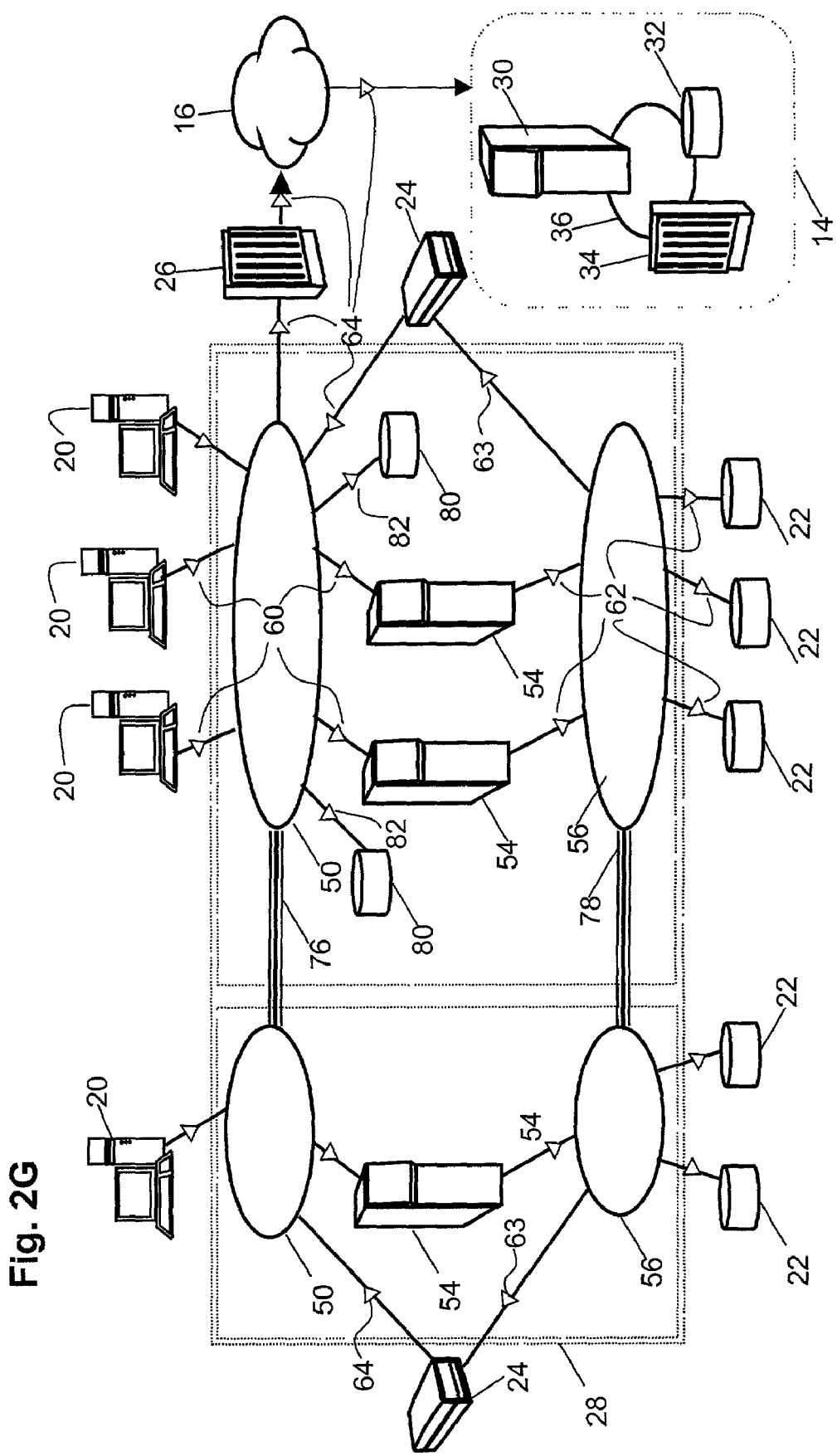

Reference is now made to FIG. 2G, which is a simplified illustration of another preferred embodiment of the information processing site communicating backup information in accordance with the present invention. The embodiment of FIG. 2G is similar to the embodiment of FIG. 2A, except in that LAN 50 of FIG. 2A is comprised of multiple LANs 50 in FIG. 2G, typically remotely located from each other, connected via interconnection 76, and SAN 56 of FIG. 2A is comprised of multiple SANs 56 in FIG. 2G, typically remotely located from each other, connected via interconnection 78. It is appreciated that while the embodiment of FIG. 2G shows both interconnections 76 and 78, only one of these two interconnections need be operative according to the present invention. It is also appreciated that multiple interconnected LANs 50 and SANs 56 can be employed using any of the embodiments shown and described in FIGS. 2A–2F.

FIG. 2G also illustrates an embodiment of the present invention which includes remote storage devices 80, typically Network Attached Storage (NAS) devices. In this embodiment, information processing devices 20 communicate I/O requests 82 to remote storage devices 80. Monitoring server 24 monitors the I/O requests 82 and communicates the corresponding backup information records 64, typically via the LAN 50, via the communication gateway 26 and via the interconnection 16 to the remote information backup and recovery site 14.

It is appreciated that in any of the embodiments of FIGS. 2A–2G, the communications gateway 26 can be connected to the SAN 56 instead of the LAN 50, as is illustrated in the embodiment shown is FIG. 2B. It is further appreciated that in the configurations of FIGS. 2A–2G the functionality of the communication gateway 26, as well as at least a portion of the functionality of information storage device 22, may be embodied in one of the application servers 54.

Figure 3B:
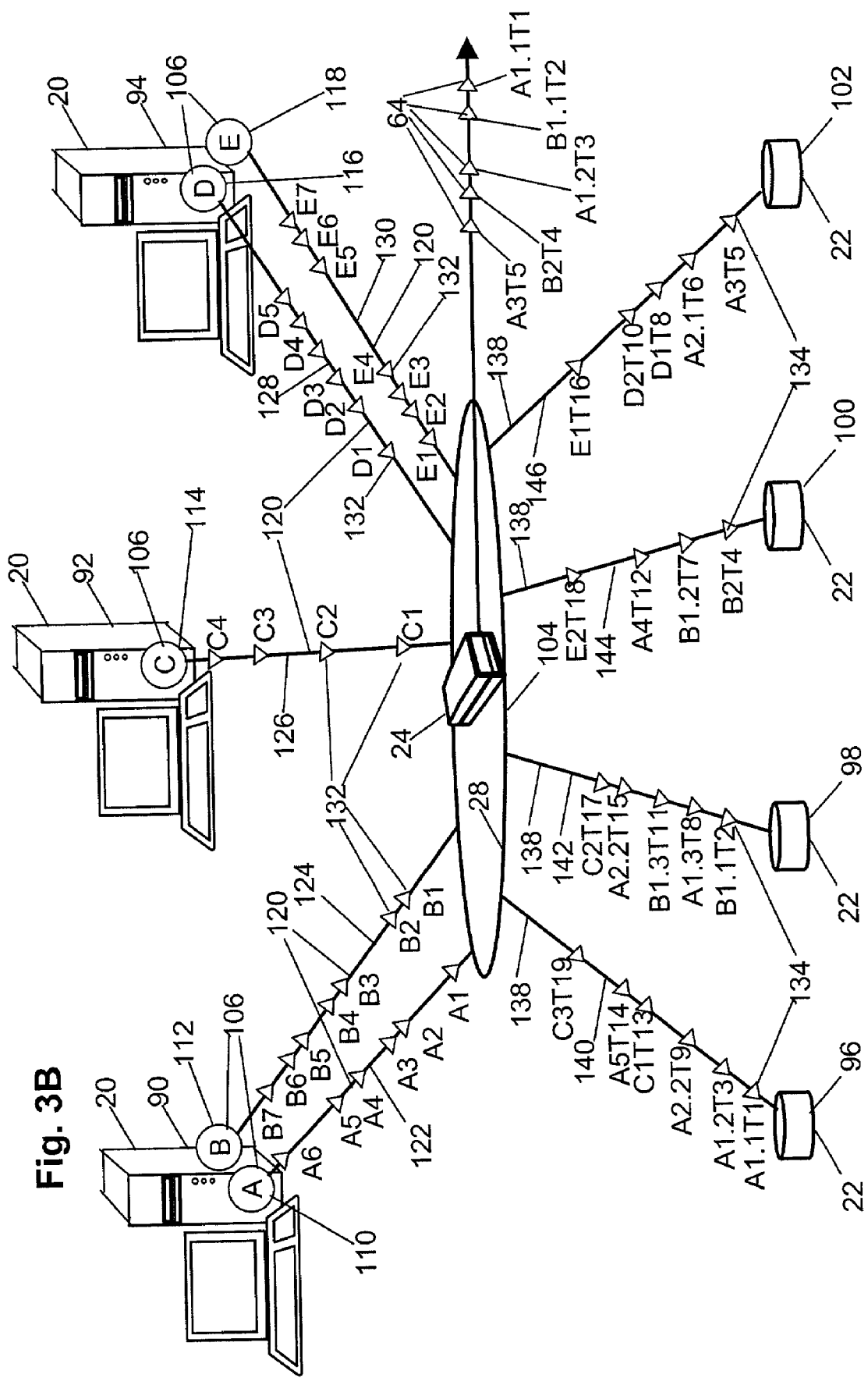

Reference is now made to FIGS. 3A and 3B, which are simplified illustrations of the flow of backup data in a data backup and recovery system and method constructed and operative in accordance with preferred embodiments of the present invention. As seen in FIG. 3A, the data processing site 12 includes one or more information processing devices 20, here specifically designated by reference numerals 90, 92 and 94, one or more information storage devices 22, here specifically designated by reference numerals 96, 98, 100 and 102, and a data switching facility 104. The data switching facility 104 comprises the interconnection 28, the monitoring server 24 and preferably also the communication gateway 26 in accordance with any of the configurations shown and described with reference to FIGS. 2A–2G. It is appreciated that the data switching facility may comprise a local area network (LAN), a storage area network (SAN), a data router, a data switch, a computer back-plane or any other device providing a similar functionality or any combination thereof.

In accordance with the preferred embodiment of the present invention illustrated in FIG. 3A, the information processing server 90 hosts one or more information processing jobs 106, here specifically designated by reference numerals 110 and 112 and by the letters A and B, respectively. The information processing device 92 hosts one or more information processing jobs 106, here specifically designated by reference numeral 114 and by the letter C. The information processing device 94 hosts one or more information processing jobs 106, here specifically designated by reference numerals 116 and 118, and by the letters D and E, respectively.

Each of the information processing jobs 106 has a stream of data 120 which flows to the data switching facility 104. The streams of data 120 of the data processing jobs 110, 112, 114, 116 and 118 are respectively specifically designated by reference numerals 122, 124, 126, 128 and 130. Each stream of data 120 comprises a sequence of data records 132, which are converted by data switching facility 104 into data records 134. The data records 132 are typically identical to the I/O requests 60 and the data records 134 are typically identical to the storage I/O requests 62 of FIGS. 2A–2G. Each data record is specifically designated by a combination of the designation letter of the originating information processing job 106 and a sequential number of the record in the stream of data 120. For example, the data records 132 sent by the data processing job 110, designated by the letter A, are designated A1, A2, A3 and so on according to the order they are sent, wherein data record A1 precedes data record A2.

It is appreciated that the intra-sequence order of the data records 132 within a stream of data 120 is at least partially a material feature of the processing job 106. It is also appreciated that the inter-sequence order of data records 132 between some of the streams of data 120 may be at least partially a material feature of the corresponding information processing jobs 106. Consequently, it is appreciated that the intra-sequence and the inter-sequence order of data records 134 may be at least partially a material feature of the information processing jobs 106. For example, if the data records 134 are not written to the information storage devices 22 in the appropriate order, the integrity of the information may be adversely affected. It is further appreciated that the transmission time delay between records 132, within a stream of data 120 or between streams of data 120, may be variable or even practically random. The overall order in which the data records 132 are received by the data switching facility 104 is designated by the letter T followed by a numeral that represent the inter-sequence order of the data records 132. Namely, a data record designated by T7 always follows a data record T6 and precedes a data record T8. For example, data record A3T7 follows the data record B4T6 and precedes the data record D2T8.

As seen in FIG. 3A, the data switching facility 104 distributes the data records 134 to the appropriate data storage devices 22. To perform the distribution task the data switching facility 104 has a stream of data 138 to each of the four data storage devices 22. The streams of data 138 to the data storage devices 96, 98, 100 and 102 are respectively specifically designated by reference numerals 140, 142, 144 and 146.

As seen in FIG. 3A, the data processing job 110, also designated by the letter A, sends data records 132, converted by data switching facility 104 into data records 134, designated with a prefix A, to data storage devices 96, 98, 100 and 102; data processing job 112, also designated by the letter B, sends data records 132, converted by data switching facility 104 into data records 134, designated with a prefix B, to data storage devices 98 and 100; data processing job 114, also designated by the letter C, sends data records 132, converted by data switching facility 104 into data records 134, designated with a prefix C, to data storage devices 96 and 98; data processing job 116, also designated by the letter D, sends data records 132, converted by data switching facility 104 into data records 134, designated with a prefix D, to data storage device 102 and data processing job 118, also designated by the letter E, sends data records 132, converted by data switching facility 104 into data records 134, designated with a prefix E, to data storage device 100 and 102.

It is appreciated that in order to ensure the integrity of the information in the information storage devices 22, the data records 134 must be written to the information storage devices 22 in the order they are received by the interconnection 28. It is especially important that the writing of a data record 134 must be finished before the writing of a related and later data record 134 is started. This requirement is equally valid for I/O operations in the information processing site 12 and for I/O operations in the information backup and recovery site 14. Preferably, the inter-sequence order values are implemented as time values, where such time value typically represents the time in which the respective data record 132 is received at the interconnection 28. In a preferred embodiment of the present invention, the monitoring server 24 creates a backup information record 64 and sends it to the information backup and recovery site 14 as soon as the corresponding data record 132 is received by interconnection 28 and detected by the monitoring server 24.

Referring now to FIG. 3B, the data switching facility 104, typically the application servers 54 within interconnection 28 within the data switching facility 104, converts each data record 132 into a plurality of data records 134. In the embodiment shown in FIG. 3B, the data records 132, designated by A1, A2 and B1, are converted into data records 134, A1.1T1, A1.2T3, A1.3T8; A2.1T6, A2.1T9 and B1.1T2, B1.2T7, B1.3T11, respectively. Preferably, the monitoring server 24 creates a backup information record 64 for each data record 134. The monitoring server 24 then sends the backup information records 64 to the information backup and recovery site 14, preserving the order in which the backup information records 64 are written to the information storage devices 22, as will be discussed hereinbelow with reference to FIGS. 4A–5.

Reference is now made to FIGS. 4A, 4B, 4C and 4D. FIGS. 4A and 4B, taken together, are a simplified illustration of the flow of backup data from the information processing site 12, via the interconnection 16, to the information backup and recovery site 14. FIG. 4A illustrates the monitoring server 24 sending the backup information records 64 via the communication gateway 26 to the interconnection 16 and FIG. 4B illustrates the data backup and recovery site 14 receiving the backup information records 64 from the interconnection 16 via the communication gateway 34.

As seen in FIG. 4A, the backup information records 64 are specifically designated by reference numerals 150 to 159 according to the order they are sent by monitoring server 24. Preferably, the monitoring server 24 creates a backup information record 64 and sends it as soon as a data record 134 is detected by the monitoring server 24.

It is appreciated that the order in which the backup information records 64 are received at the information backup and recovery site 14 may be different from the order in which backup information records 64 are sent by the monitoring server 24 of the information processing site 12, as seen in FIG. 4B.

The backup information records 64 are marked by the monitoring server 24 with corresponding order stamps 162. The order stamps 162 designate the order in which the corresponding backup information records 64 are received by the interconnection 28. In the embodiment of FIGS. 4A and 4B, which corresponds to the embodiment of FIG. 3A, the order stamp 162 comprises the designation letter of the information processing job 106 that originated the I/O requests 60 for which the specific backup information records 64 is sent, followed by the sequential number of the I/O request 60 in the stream of data 120, followed by the letter "T" and the overall sequential number that designates the order of arrival of the I/O request 60 at the interconnection 28.

In another preferred embodiment of the present invention, the order stamp 162 comprises a time mark that designates the order of arrival of the I/O requests 60 or the storage I/O requests 62 at the interconnection 28 and their detection by the monitoring server 24.

FIGS. 4C and 4D, taken together, are a simplified illustration of the flow of backup data from the information processing site 12, via the interconnection 16, to the information backup and recovery site 14 in another preferred embodiment of the present invention. As seen in FIGS. 4C and 4D, the order stamp 162 comprises an order mark, typically a numerator, designating the order of arrival of the I/O request 60 or the storage I/O requests 62 at the interconnection 28 and their detection by the monitoring server 24, and a time mark, designating the time of arrival of the I/O request 60 or the storage I/O requests 62 at the interconnection 28 and their detection by the monitoring server 24. The order mark is designated in FIGS. 4C and 4D by the letter N followed by an integer and the time mark is designated by the letter T followed by a time value represented by an integer.

Reference is now made to FIG. 5, which is a simplified illustration of the flow of backup data into and within the information backup and recovery site 14 in accordance with a preferred embodiment of the present invention. As seen in FIG. 5, the information backup and recovery site 14 comprises a communication gateway 34, a data switching facility 170, typically communicating with one or more information backup and recovery servers 30, here specifically designated by reference numerals 172 and 174, which communicate with one or more information storage devices 32, here specifically designated by reference numerals 176, 178, 180 and 182, typically via another information switching facility 184. The information backup and recovery servers 30 have a temporary memory 186, implemented in FIG. 5 as shared redundant disk storage. It is appreciated that the temporary memory 186 can comprise a RAM memory, a non-volatile memory, a log file stored in the disk storage system, or any other suitable temporary storage device.

In the embodiment shown in FIG. 5, the information switching facilities 170 and 184 may be a local area network (LAN), a data router, a data switch, a storage area network (SAN), a computer back-plane or any other device providing a similar functionality.

In the embodiment of FIG. 5, the two backup and recovery servers 30 are provided for redundancy and enhanced reliability. It is appreciated that a single information backup and recovery server 30 as well as more than two information backup and recovery servers 30 can be used. It is further appreciated that the functionality of the communication gateway 34, as well as the functionality of part or all of information storage devices 32, may be embodied in one of the information backup and recovery servers 30.

As seen in FIG. 5, the backup information records 64 are received at the data-switching device 170, which distributes the backup information records 64 to the backup and recovery servers 30. The backup and recovery servers 30 distribute the data records to the data storage devices 32.

In a preferred embodiment of the present invention, the backup and recovery servers 30 store the backup information records 64 that are received out of sequence in the temporary memory 186, until the sequence is completed. Typically, the information backup and recovery site 14 verifies that a sequence is completed by checking the order stamps 162 of the backup information records 64 in the temporary memory. Preferably, the order stamps 162 are a sequence of integer numbers and the information backup and recovery site 14 verifies that a complete sequence of one or more order stamps 162 exists in the temporary memory. When a complete sequence of order stamps 162, corresponding to backup information records 64, following the earliest available order stamp 162 is found in temporary memory, the information backup and recovery site 14 writes this sequence of backup information records 64 to the data storage devices 32. Preferably, the backup information records 64 are written to the data storage devices 32 in their respective order according to their order stamps 162.

For example, as shown in FIG. 4D, the backup information records 64 designated by reference numerals 150, 151 and 152 are received at the information backup and recovery site 14 in the order 152, 150, 151. The backup information records 64 designated by reference numerals 152 and 150, with order stamps 162 N2T2 and N3T3 respectively, were stored in the temporary memory 186 until the backup information records 64 designated by reference numeral 151, with order stamp 162 N1T1 was received and the sequence was completed. Then, as seen in FIG. 5, the backup information records 64, designated by reference numerals 150, 151, and 152, are written to the data storage devices 32. In the example shown in FIG. 5, the backup information records 64 are written to the data storage devices 32 in the order they have been written to the information storage devices 22, namely 151, 152, and 150, according to their corresponding order stamps 162, N1T1, N2T2 and N3T3.

As also seen in FIG. 4D, the backup information records 64 designated by reference numerals 156 and 154, bearing the corresponding order stamps 162 N6T6 and N5T5, are received next. As seen in FIG. 5, the backup information records 64 designated by reference numerals 156 and 154 are stored in the temporary memory 186 until the backup information record 64 designated by reference numeral 153 and bearing the order stamp 162 N4T4 is received.

In a preferred embodiment of the present invention the backup and recovery servers 30 check the storage addresses where the backup information records 64 are to be written to. The backup information records 64 that are not being sent to the same data storage devices 32 are written in parallel, not necessarily according to the order of their order stamps 162.

In a preferred embodiment of the present invention, the backup and recovery servers 30 check the storage addresses where the backup information records 64 are to be written to. If more than one backup information record 64 is to be written to the same place in the data storage devices 32, the backup and recovery server 30 writes only the last backup information record 64 to be written to that same place. It is appreciated that this procedure enables the backup and recovery server 30 to quickly purge the temporary memory 186 to the data storage devices 32.

It is appreciated that each sequence completion serves as a point of synchronization between the information processing site 12 and the information backup and recovery site 14, or as a point of consistency of the backup information received at the information backup and recovery site 14.

It is appreciated that in case of a failure of the backup and recovery site 14 during the process of writing backup information records 64 to the information storage devices 32 an internal recovery process can employ the information stored in the temporary memory 186, especially when implemented in non-volatile memory or as a log file in the disk storage system, to recover backup information up and until the latest backup information record 64 in the temporary memory 186 for which the sequence of order stamps 162 is complete.

It is appreciated that the information recovery process, which follows a failure of the information processing site 12, can recover the information up to the latest backup information record 64, which may still reside in the temporary memory 186, provided that information consistency is preserved, for example, up and until the latest backup information record 64 for which the sequence of order stamps is complete.

In an alternative embodiment of the information backup and recovery site 14 of the present invention, designated as "log-based backup", the order by which the backup information records 64 are stored in the information storage devices 32 is immaterial, and, for example, can be the order of their arrival at the information switching facility 170. In this embodiment, the backup information records 64 and the corresponding order stamps 162 are stored in the data storage devices. Alternatively, the order stamps 162 are stored separately from the backup information records 64, for example, in a separate file or even in a separate information storage device 32, and are associated with their respective backup information records 64, for example, with a pointer embedded in each order stamp 162 pointing to the respective backup information record 64. In this embodiment, the backup information records 64 stored in the information storage devices 32 of the information backup and recovery site 14 are used in the recovery process. The recovered data-structure can be rebuilt in the information processing site 12 or in the information backup and recovery site 14.

It is appreciated that in the case of a failure of the information processing site 12, all the storage I/O requests 62 that have not yet been sent to the backup and recovery site 14 are lost.

In the preferred embodiment of the present invention, shown and described with reference to FIGS. 1–5, the backup processes enable the information processing site 12 to transmit the storage I/O requests 62 to the information backup and recovery site 14 without any delay, greatly reducing the possibility that storage I/O requests 62 are awaiting transmission to the information backup and recovery site 14 and are thus lost. Additionally, the backup processes described enable the information backup and recovery site 14 to identify the points of synchronization, or the points of consistency, without requiring the information processing site 12 to delay the sending of more I/O requests 62 until the recent point of synchronization is identified. The information processing site 12 also does not wait to receive an acknowledgement from the information backup and recovery site 14 that a synchronization point has been identified.

Additionally, in the preferred embodiment of the present invention described above, there is no requirement to define the points of synchronization in advance. Advance definition of the points of synchronization typically results in relatively low frequency of points of synchronization. Thus, in the case of a failure of the information processing site 12, I/O requests 62 that are received at the information backup and recovery site 14 since the last synchronization point are deemed lost, even if these I/O requests 62 are already written to the information storage devices 32. Also, synchronization at the information processing site 12 causes delays in the sending of the backup information records 64 and therefore increases the possibility of congestion, and decreases the efficiency, of the interconnection 16.

Thus, the present invention provides for less potential data loss in the event of a failure of the information processing site 12, as well as increased efficiency of the interconnection 16.

Reference is now made to FIGS. 6 and 7, which are simplified illustrations of the flow of recovery data within a data backup and recovery system and method constructed and operative in accordance with a preferred embodiment of the present invention. The embodiment of FIGS. 6 and 7 describes the flow of recovery data from the information backup and recovery site 14, which enables the recovery of the data-structure at the information processing site 12, in the case of a "log-based backup". As seen in FIGS. 6 and 7, the backup information records 64 are transmitted to the information processing site 12 according to their respective order stamps 162, with the backup information records 64 associated with the earlier order stamps 162 being sent first. The backup information records 64 are thus transmitted to the information processing site 12 in the order they were originally sent by their originating information processing job 106. In the process of data recovery of FIGS. 6 and 7, the data-structure is recovered in the information processing site 12 and further processing continues in the information processing site 12 after the recovery of the data-structure is completed. Alternatively, the information processing activity continues directly from the data-structure in the information backup and recovery site 14.

Reference is now made to FIG. 8, which is a simplified illustration of the flow of backup information and associated order stamps from a plurality of monitoring servers 24 operative in accordance with a preferred embodiment of the present invention. As seen in FIG. 8, a plurality of monitoring servers 24 send backup information records 64 and corresponding order stamps 162 to backup and recovery site 14. It is appreciated that the monitoring servers 24 are operative to assign order stamps 162 to the backup information records 64, wherein the order stamps 162 comprise a universal order information, typically a time stamp, providing the order of the backup information records 64 across all monitoring servers 24. Additionally and alternatively, the order stamps 162 may comprise a global order stamp, typically a single numerator that is common to all the monitoring servers 24. The plurality of monitoring servers 24 of FIG. 8 may be part of a single information processing site 12, as is shown and described in FIGS. 2D, 2E and 2G or may be located in multiple information processing sites 12. The plurality of monitoring servers 24 enables the information processing site 12 to send the backup information records 64 in parallel. This configuration decreases the number of storage I/O requests 62 that may be lost in the case of a failure of the information processing site 12.

Reference is now made to FIG. 9, which is a simplified illustration of the flow of backup information and separate, associated, order stamps, from a plurality of information processing sites operative in accordance with another preferred embodiment of the present invention. As seen in the embodiment of FIG. 9, the backup information records 64, bearing their order stamps 162, are sent via a first interconnection 16, here specifically designated by reference numeral 190, and written directly to the temporary memory 186 of the backup and recovery site 14. The order stamps 162, here specifically designated by reference numeral 192, are also sent to the backup and recovery site 14, in parallel to the backup information records 64, via a second interconnection 16, here specifically designated by reference numeral 194, to the information backup and recovery servers 30. Each of the order stamps 192 typically comprises a pointer that associates the order stamp 192 with its corresponding backup information record 64. Typically, when the information backup and recovery servers 30 detect a complete sequence of order stamps 192, the information backup and recovery servers 30 retrieve the corresponding backup information records 64 from the temporary memory 186 and write them to the information storage devices 32.

Reference is now made to FIGS. 10A and 10B, which, taken together, form a simplified flow chart of a typical procedure, executed by the information backup and recovery servers 30 of a data backup and recovery system, comprising a multiplicity of monitoring servers 24, as shown and described above with reference to FIGS. 8 and 9, in accordance with a preferred embodiment of the present invention, to manage the temporary memory 186.

As seen in FIG. 10A, in steps 200 and 202, the information backup and recovery server 30 receives a backup information record 64 and stores it in the temporary memory 186, in a queue associated with the monitoring server 24 from which the backup information record 64 has been received. In step 204 the information backup and recovery server 30 attempts to create a complete sequence of backup information records 64 for the specific monitoring server 24. If the attempt succeeds (step 206), the backup and recovery server 30 updates the "last order mark" and the "last time mark" fields that are associated with the specific monitoring server 24 according to the order mark and the time mark of the last backup information records 64 in the complete sequence (step 208) and proceeds to scan the temporary memory 186 (FIG. 10B). If the attempt to create a complete sequence fails, the procedure ends.

As seen in FIG. 10B, the procedure of scanning the temporary memory first checks that all the monitoring servers 24 have a complete sequence (step 210). If all the monitoring servers 24 have a complete sequence the procedure calculates (step 212) the values of "next consistency point", which is the earliest of the "last time marks" of all the complete sequences. As described hereinabove with reference to FIG. 10A, a "last time mark" is created for each complete sequence.

Optionally, as shown and described in FIG. 10B, the procedure executes steps 214 and 216, in which all backup information records 64 which are to be written to the same area in the information storage device 32 are erased except for the latest backup information record 64.

The procedure then proceeds to steps 218 and 220 in which all the backup information records 64 in the temporary memory 186, with a time mark earlier or equal to the "next consistency point", are written to the information storage devices 32 and then erased from the temporary memory 186.

Reference is now made to Appendix 1, which is a computer listing which forms a preferred software embodiment of the present invention.

A preferred method for installing and running the software listing of the CD-ROM Appendix 1 is as follows:

1. SANSafe Management Server Installation:
1.1. Provide an Intel compatible computer with a minimum of 512 MB RAM, 350 Mhz CPU, 30 Gigabyte Hard disk, and a network interface card. Install a Microsoft Windows 2000 operating system and Microsoft Internet Explorer. Ensure that the Virtual memory page size is configured to allow growth to 4 gigabytes.
1.2. Provide connectivity via a Local Area Network and/or a Wide Area Network.
1.3. Unhex the computer listing 42541.HEX of Appendix 1 using HEX IT V1.8 or greater by John Augustine, 3129 Earl St., Laureldale, Pa. 19605 creating file 42541.ZIP.
1.4. Decompress the file 42541.ZIP using WINZIP version 6.2 or greater, extracting all files into their respective directories utilizing the WINZIP version 6.2 option "Use folder names".
1.5. Open the Windows explorer.
1.6. Double click on the Management Server directory labeled "MGMT Server SetUp".
1.7. Double click on the setup icon.
1.8. Follow the default prompts provided therein.

2. SANSafe Management Client Installation:
2.1. Provide an Intel compatible computer with a minimum of 128 MB RAM, 350 Mhz CPU, and a network interface card. Install a Microsoft Windows 2000 operating system and Microsoft Internet Explorer.
2.2. Provide connectivity via a Local Area Network and/or a Wide Area Network.
2.3. Unhex the computer listing 42541.HEX of Appendix 1 using HEX IT V1.8 or greater by John Augustine, 3129 Earl St., Laureldale, Pa. 19605 creating file 42541.ZIP.
2.4. Decompress the file 42541.ZIP using WINZIP version 6.2 or greater, extracting all files into their respective directories utilizing the WINZIP version 6.2 option "Use folder names".
2.5. Open the Windows explorer.
2.6. Double click on the Management Client directory labeled "MGMT Client SetUp",
2.7. Double click on the setup icon.
2.8. Follow the default prompts provided therein.

3. Replication Appliance Installation:
3.1. Provide an Intel compatible computer with a minimum of 512 MB RAM, 350 Mhz CPU, 30 Gigabyte Hard disk, and a network interface card. Install a Microsoft Windows 2000 operating system and Microsoft Internet Explorer. Ensure that the Virtual memory page size is configured to allow growth to 4 gigabytes.
3.2. Provide connectivity via a Local Area Network and/or a Wide Area Network.
3.3. Unhex the computer listing 42541.HEX of Appendix 1 using HEX IT V1.8 or greater by John Augustine, 3129 Earl St., Laureldale, Pa. 19605 creating file 42541.ZIP.
3.4. Decompress the file 42541.ZIP using WINZIP version 6.2 or greater, extracting all files into their respective directories utilizing the WINZIP version 6.2 option "Use folder names".

3.5. Open the Windows explorer.
3.6. Double click on the Replication Appliance directory labeled "Replication Appliance SetUp".
3.7. Double click on the setup icon.
3.8. Follow the default prompts provided therein.
4. Installing the Replication Agent:
4.1. Provide an Intel compatible computer with a minimum of 512 MB RAM, 350 Mhz CPU, 30 Gigabyte Hard disk, and a network interface card. Install a Microsoft Windows 2000 operating system and Microsoft Internet Explorer. Ensure that the Virtual memory page size is configured to allow growth to 4 gigabytes.
4.2. Provide connectivity via a Local Area Network and/or a Wide Area Network.
4.3. Unhex the computer listing 42541.HEX of Appendix 1 using HEX IT V1.8 or greater by John Augustine, 3129 Earl St., Laureldale, Pa. 19605 creating file 42541.ZIP.
4.4. Decompress the file 42541.ZIP using WINZIP version 6.2 or greater, extracting all files into their respective directories utilizing the WINZIP version 6.2 option "Use folder names".
4.5. Open the Windows explorer.
4.6. Double click on the Replication Agent directory labeled "Replication Agent SetUp".
4.7. Double click on the setup icon.
4.8. Follow the default prompts provided therein.

5. Running the SANSafe Management Server:
5.1. On the computer terminal referenced in step 1.1:
5.1.1. Ensure connectivity via a Local Area Network to the Replication appliance referenced in step 3.
5.1.2. Click on "Start"
5.1.3. Select "Programs"
5.1.4. Click on "SANSafe Management Server"

6. Running the SANSafe Management Client:
6.1. On the computer terminal referenced in step 2.1:
6.1.1. Ensure connectivity via a Local Area Network and/or a Wide Area Network to the Management Server machine referenced in step 1 above.
6.1.2. Open the Microsoft Internet Explorer Browser.
6.1.3. Open MGMT/SANSafe/SanPro.html.

7. Running the Replication Appliance:
7.1. On the computer terminal referenced in step 3.1:
7.1.1. Ensure connectivity via a Local Area Network and/or a Wide Area Network to the Replication Agent referenced in step 4 above.
7.1.2. Click on "Start"
7.1.3. Select "Programs"
7.1.4. Click on "SANSafe Replication Appliance"

8. Running the Replication Agent:
8.1. On the computer terminal referenced in step 4.1:
8.1.1. Ensure connectivity via a Local Area Network and/or a Wide Area Network to the Replication Appliance machine referenced in step 3 above.
8.1.2. Right click on the "my computer" icon
8.1.3. Select "Manage"
8.1.4. Double Click on "Services and Applications"
8.1.5. Double click on "Services"
8.1.6. Right click on "SANSafe Replication Agent"
8.1.7. Select "Start"

It is appreciated that the particular embodiment implemented by the appendix is intended only to provide an extremely detailed disclosure of the present invention and is not intended to be limiting.

It will be appreciated by persons skilled in the art that the present invention is not limited by what has been particularly shown and described herein above. Rather the scope of the present invention includes both combinations and sub-combinations of the various features described hereinabove as well as variations and modifications which would occur to persons skilled in the art upon reading the specifications and which are not in the prior art.

The invention claimed is:

1. A data backup and recovery system for use with at least one server interconnected with at least one storage device, said data backup and recovery system comprising:
   at least one data recovery device;
   at least one data recovery storage device comprising a permanent storage component associated with and controlled by said at least one data recovery device; and
   at least one data communication monitor for providing to said at least one data recovery device at least control information bearing an order stamp including an order mark and a time mark regarding data communications between corresponding ones of said at least one server and said at least one storage device,
   said at least one data recovery device being responsive to at least said control information bearing an order stamp for storing data on said permanent storage component of said at least one data recovery storage device in a manner which enables reconstruction of a complete sequence of data communications for each of said at least one data communication monitor and enables reconstruction of a representation of said data communications at a given earlier time but does not require that the data be sent to said at least one data recovery device in a given order and stored on said permanent storage component of said at least one data recovery storage device in a given order before re-ordering the data.

2. A data backup and recovery system according to claim 1 and wherein at least one of said at least one data communication monitor is located other than at said at least one storage device.

3. A data backup and recovery system according to claim 1 and wherein said at least one data communication monitor also provides at least part of said data communications to said at least one data recovery device.

4. A data backup and recovery system according to claim 2 and wherein said at least one data communication monitor also provides at least part of said data communications to said at least one data recovery device.

5. A data backup and recovery system according to claim 1 and wherein said at least one data recovery device is operative to receive said at least control information and to store data on said at least one data recovery storage device in parallel.

6. A data backup and recovery system according to claim 1 and wherein said data communications comprise data updates.

7. A data backup and recovery system according to claim 1 and wherein said reconstruction of a representation of said data communications at a given earlier time guarantees that if the order stamp of a first update is smaller than the order stamp of a second update, the second update is not stored on said at least one data recovery storage device unless the first update is stored on said at least one data recovery storage device.

8. A data backup and recovery system according to claim 1 and wherein individual ones of said at least one data communication monitor are associated with individual ones of said at least one server.

9. A data backup and recovery system according to claim 1 and wherein said at least one data communication monitor is associated with network elements of a storage area network.

10. A data backup and recovery system according to claim 1 and wherein at least one of said control information and said data communications is communicated from said at least one data communication monitor to said at least one data recovery device via a network.

11. A data backup and recovery system according to claim 10 and wherein said network is a private network.

12. A data backup and recovery system according to claim 10 and wherein said network is a public network.

13. A data backup and recovery system according to claim 1 and wherein at least one of said control information and said data communications is communicated from said at least one data communication monitor to said at least one data recovery device via a storage area network.

14. A data backup and recovery system according to claim 1 and wherein said at least one data communication monitor provides at least part of said data communications to said at least one data recovery storage device other than via said at least one data recovery device.

15. A data backup and recovery system according to claim 1 and also comprising at least one LOG storage device wherein said at least one LOG storage device comprises at least control information bearing a time mark regarding data communications between corresponding ones of said at least one server and said at least one storage device via a storage area network.

16. A data backup and recovery system according to claim 15 and wherein said at least one data communication monitor also stores at least part of said data communications to said at least one LOG storage device.

17. A data backup and recovery system according to claim 16 and wherein said data communications stored to said at least one LOG storage device comprise data updates sent by said at least one server to said at least one storage device.

18. A data backup and recovery system according to claim 17 having said at least one LOG storage device such that if either said control information or said data communications or both are prematurely erased from said at least one data recovery device due to a failure or other event, said at least one data recovery device restores either said control information or said data communications or both from said at least one LOG storage device.

19. A data backup and recovery system according to claim 18 and wherein said at least one data recovery device resumes its activities with said control information or said data communications or both restored from said at least one LOG storage device.

20. A data backup and recovery system according to claim 18 and wherein said at least part of said data communications is communicated from said at least one data communication monitor to said at least one LOG storage device via a network.

21. A data backup and recovery system according to claim 20 and wherein said network is a private network.

22. A data backup and recovery system according to claim 20 and wherein said network is a public network.

23. A data backup and recovery system according to claim 18 and wherein at least part of said data communications is communicated from said at least one data communication monitor to said at least one LOG storage device via said storage area network.

24. A data backup and recovery system according to claim 17 and wherein said at least one data recovery device retrieves said at least part of said data communications from at least one LOG storage device for the purpose of storing said data to at least one data recovery storage device associated therewith in a time ordered manner.

25. A data backup and recovery system according to claim 17 wherein said at least one data recovery device retrieves both said control information and said at least part of said data communications from at least one LOG storage device for the purpose of storing said data to at least one data recovery storage device associated therewith in a time ordered manner.

26. A data backup and recovery system according to claim 25 and wherein both said control information and said at least part of said data communications are communicated from said at least one data communication monitor to said at least one LOG storage device via a network.

27. A data backup and recovery system according to claim 26 and wherein said network is a private network.

28. A data backup and recovery system according to claim 26 and wherein said network is a public network.

29. A data backup and recovery system according to claim 25 and wherein both said control information and said at least part of said data communications are communicated from said at least one data communication monitor to said at least one LOG storage device via said storage area network.

30. A data backup and recovery system according to claim 1 and wherein said reconstruction of a representation comprises sending said data communications from said at least one data recovery storage device to said at least one storage device.

31. A data backup and recovery system according to claim 1 and wherein said reconstruction of a representation comprises employing said at least one data backup and recovery system as at least one of said at least one server and said at least one storage device.

32. A data backup and recovery system according to claim 1 and wherein said at least one server and said at least one storage device are interconnected via a local area network (LAN).

33. A data backup and recovery system according to claim 32 and wherein said at least one data communication monitor monitors data communications between said at least one server and said at least one storage device over said LAN.

34. A data backup and recovery system according to claim 1 and wherein said at least one server and said at least one storage device are interconnected via a storage area network (SAN).

35. A data backup and recovery system according to claim 34 and wherein said at least one data communication monitor monitors data communications between said at least one server and said at least one storage device over said SAN.

36. A data backup and recovery system according to claim 34 and wherein said SAN comprises said at least one data communication monitor.

37. A data backup and recovery system according to claim 1 and wherein said at least one storage device is a network attached storage (NAS) device.

38. A data backup and recovery system according to claim 1 and wherein said at least one server comprises said at least one data communication monitor.

39. A data backup and recovery system according to claim 1 and wherein said at least one storage device comprises said at least one data communication monitor.

40. A data backup and recovery system for use with at least one server interconnected with at least one storage device, said data backup and recovery system comprising:
at least one data recovery device;
at least one data recovery storage device comprising a permanent storage component associated with and controlled by said at least one data recovery device; and
data communication monitors for providing to said at least one data recovery device at least control information bearing an order stamp including an order mark and a time mark regarding data communications between corresponding ones of said at least one server and said at least one storage device,
said at least one data recovery device being operative to receive said at least control information and to store data on said permanent storage component of said at least one data recovery storage device in parallel and not requiring that the data be received by said at least one data recovery device in a given order before re-ordering the data.

41. A data backup and recovery system according to claim 40 and wherein at least one of said at least one data communication monitor is located other than at said at least one storage device.

42. A data backup and recovery system according to claim 41 and wherein said at least one data communication monitor also provides at least part of said data communications to said at least one data recovery device.

43. A data backup and recovery system according to claim 40 and wherein said at least one data communication monitor also provides at least part of said data communications to said at least one data recovery device.

44. A data backup and recovery system according to claim 40 and wherein said at least one data recovery device is operative to receive said at least control information and to store data on said at least one data recovery storage device in parallel.

45. A data backup and recovery system according to claim 40 and wherein said data communications comprise data updates.

46. A data backup and recovery system according to claim 40 and wherein said reconstruction of a representation of said data communications at a given earlier time guarantees that if the order stamp of a first update is smaller than the order stamp of a second update, the second update is not stored on said at least one data recovery storage device unless the first update is stored on said at least one data recovery storage device.

47. A data backup and recovery system according to claim 40 and wherein individual ones of said at least one data communication monitor are associated with individual ones of said at least one server.

48. A data backup and recovery system according to claim 40 and wherein said at least one data communication monitor is associated with network elements of a storage area network.

49. A data backup and recovery system according to claim 40 and wherein at least one of said control information and said data communications is communicated from said at least one data communication monitor to said at least one data recovery device via a network.

50. A data backup and recovery system according to claim 49 and wherein said network is a private network.

51. A data backup and recovery system according to claim 49 and wherein said network is a public network.

52. A data backup and recovery system according to claim 40 and wherein at least one of said control information and said data communications is communicated from said at least one data communication monitor to said at least one data recovery device via a storage area network.

53. A data backup and recovery system according to claim 40 and wherein said at least one data communication monitor provides at least part of said data communications to said at least one data recovery storage device other than via said at least one data recovery device.

54. A data backup and recovery system according to claim 40 and also comprising at least one LOG storage device wherein said at least one LOG storage device comprises at least control information bearing a time mark regarding data communications between corresponding ones of said at least one server and said at least one storage device via a storage area network.

55. A data backup and recovery system according to claim 54 and wherein said at least one data communication monitor also stores at least part of said data communications to said at least one LOG storage device.

56. A data backup and recovery system according to claim 55 and wherein said data communications stored to said at least one LOG storage device comprise data updates sent by said at least one server to said at least one storage device.

57. A data backup and recovery system according to claim 56 wherein said at least one data recovery device retrieves both said control information and said at least part of said data communications from at least one LOG storage device for the purpose of storing said data to at least one data recovery storage device associated therewith in a time ordered manner.

58. A data backup and recovery system according to claim 57 and wherein both said control information and said at least part of said data communications are communicated from said at least one data communication monitor to said at least one LOG storage device via said storage area network.

59. A data backup and recovery system according to claim 57 and wherein both said control information and said at least part of said data communications are communicated from said at least one data communication monitor to said at least one LOG storage device via a network.

60. A data backup and recovery system according to claim 59 and wherein said network is a private network.

61. A data backup and recovery system according to claim 59 and wherein said network is a public network.

62. A data backup and recovery system according to claim 56 and wherein said at least one data recovery device retrieves said at least part of said data communications from at least one LOG storage device for the purpose of storing said data to at least one data recovery storage device associated therewith in a time ordered manner.

63. A data backup and recovery system according to claim 54 having said at least one LOG storage device such that if either said control information or said data communications or both are prematurely erased from said at least one data recovery device due to a failure or other event, said at least one data recovery device restores either said control information or said data communications or both from said at least one LOG storage device.

64. A data backup and recovery system according to claim 63 and wherein said at least one data recovery device resumes its activities with said control information or said data communications or both restored from said at least one LOG storage device.

65. A data backup and recovery system according to claim 63 and wherein said at least part of said data communications is communicated from said at least one data communication monitor to said at least one LOG storage device via a network.

66. A data backup and recovery system according to claim 65 and wherein said network is a private network.

67. A data backup and recovery system according to claim 65 and wherein said network is a public network.

68. A data backup and recovery system according to claim 63 and wherein at least part of said data communications is communicated from said at least one data communication monitor to said at least one LOG storage device via said storage area network.

69. A method for data backup and recovery for use with at least one server interconnected with at least one storage device, the method comprising:
providing at least one data recovery device;
providing at least one data recovery storage device comprising a permanent storage component associated with and controlled by said at least one data recovery device; and
providing at least one data communication monitor operative to perform:
monitoring the data communication between said at least one server and said at least one storage device;
creating at least control information bearing an order stamp including an order mark and a time mark regarding said data communications between corresponding ones of said at least one server and said at least one storage device; and
sending said monitored data communications and said control information to said permanent storage component of said at least one data recovery device,
said at least one data recovery device responding to said at least said control information in a manner which enables reconstruction of a complete sequence of data communications for each of said at least one data communication monitor and enables reconstruction of a representation of said data communications at a given earlier time but not requiring that said sending said monitored data communications and said control information to said permanent storage component of said at least one data recovery device be in a given order and stored on said at least one data recovery storage device in a given order before re-ordering the data.

70. A method for data backup and recovery according to claim 69 and wherein at least one of said at least one data communication monitor is provided other than at said at least one storage device.

71. A method for data backup and recovery according to claim 70 and wherein said at least one data communication monitor also provides at least part of said data communications to said at least one data recovery device.

72. A method for data backup and recovery according to claim 69 and wherein said at least one data communication monitor also provides at least part of said data communications to said at least one data recovery device.

73. A method for data backup and recovery according to claim 69 and wherein said at least one data recovery device is operative to receive said at least control information and to store data on said at least one data recovery storage device in parallel.

74. A method for data backup and recovery according to claim 69 and wherein said data communications comprise data updates.

75. A method for data backup and recovery according to claim 69 and wherein said reconstruction of a representation of said data communications at a given earlier time guarantees that if the order stamp of a first update is smaller than the order stamp of a second update, the second update is not stored on said at least one data recovery storage device unless the first update is stored on said at least one data recovery storage device.

76. A method for data backup and recovery according to claim 69 and wherein individual ones of said at least one data communication monitor are associated with individual ones of said at least one server.

77. A method for data backup and recovery according to claim 69 and wherein said at least one data communication monitor is associated with network elements of a storage area network.

78. A method for data backup and recovery according to claim 69 and wherein at least one of said control information and said data communications is communicated from said at least one data communication monitor to said at least one data recovery device via a network.

79. A method for data backup and recovery according to claim 78 and wherein said network is a private network.

80. A method for data backup and recovery according to claim 78 and wherein said network is a public network.

81. A method for data backup and recovery according to claim 69 and wherein at least one of said control information and said data communications is communicated from said at least one data communication monitor to said at least one data recovery device via a storage area network.

82. A method for data backup and recovery according to claim 69 and wherein said at least one data communication monitor provides at least part of said data communications to said at least one data recovery storage device other than via said at least one data recovery device.

83. A method for data backup and recovery according to claim 69 and also comprising storing at least control information on at least one LOG storage device, said at least control information bearing a time mark regarding data communications between corresponding ones of said at least one server and said at least one storage device via a storage area network.

84. A method for data backup and recovery according to claim 83 and wherein said at least one data communication monitor also stores at least part of said data communications to said at least one LOG storage device.

85. A method for data backup and recovery according to claim 84 and wherein said data communications stored to said at least one LOG storage device comprise data updates sent by said at least one server to said at least one storage device.

86. A method for data backup and recovery according to claim 85 such that if either said control information or said data communications or both are prematurely erased from said at least one data recovery device due to a failure or other event, said at least one data recovery device restores either said control information or said data communications or both from said at least one LOG storage device.

87. A method for data backup and recovery according to claim 86 wherein said at least one data recovery device resumes its activities with said control information or said data communications or both restored from said at least one LOG storage device.

88. A method for data backup and recovery according to claim 86 and wherein said at least part of said data communications is communicated from said at least one data communication monitor to said at least one LOG storage device via a network.

89. A method for data backup and recovery according to claim 88 and wherein said network is a private network.

90. A method for data backup and recovery according to claim 88 and wherein said network is a public network.

91. A method for data backup and recovery according to claim 86 and wherein at least part of said data communications is communicated from said at least one data communication monitor to said at least one LOG storage device via said storage area network.

92. A method for data backup and recovery according to claim 85 wherein said at least one data recovery device retrieves said at least part of said data communications from at least one LOG storage device for the purpose of storing said data to at least one data recovery storage device associated therewith in a time ordered manner.

93. A method for data backup and recovery according to claim 85 wherein said at least one data recovery device retrieves both said control information and said at least part of said data communications from at least one LOG storage device for the purpose of storing said data to at least one data recovery storage device associated therewith in a time ordered manner.

94. A method for data backup and recovery according to claim 93 and wherein both said control information and said at least part of said data communications are communicated from said at least one data communication monitor to said at least one LOG storage device via a network.

95. A method for data backup and recovery according to claim 94 and wherein said network is a private network.

96. A method for data backup and recovery according to claim 94 and wherein said network is a public network.

97. A method for data backup and recovery according to claim 93 and wherein both said control information and said at least part of said data communications are communicated from said at least one data communication monitor to said at least one LOG storage device via said storage area network.

98. A method for data backup and recovery according to claim 69 and wherein said reconstruction of a representation comprises sending said data communications from said at least one data recovery storage device to said at least one storage device.

99. A method for data backup and recovery according to claim 69 and wherein said reconstruction of a representation comprises employing said at least one data backup and recovery system as at least one of said at least one server and said at least one storage device.

100. A method for data backup and recovery according to claim 69 and wherein said at least one server and said at least one storage device are interconnected via a local area network (LAN).

101. A method for data backup and recovery according to claim 100 and wherein said at least one data communication monitor monitors data communications between said at least one server and said at least one storage device over said LAN.

102. A method for data backup and recovery according to claim 69 and wherein said at least one server and said at least one storage device are interconnected via a storage area network (SAN).

103. A method for data backup and recovery according to claim 102 and wherein said at least one data communication monitor monitors data communications between said at least one server and said at least one storage device over said SAN.

104. A method for data backup and recovery according to claim 102 and wherein said SAN comprises said at least one data communication monitor.

105. A method for data backup and recovery according to claim 69 and wherein said at least one storage device is a network attached storage (NAS) device.

106. A method for data backup and recovery according to claim 69 and wherein said at least one server comprises said at least one data communication monitor.

107. A method for data backup and recovery according to claim 69 and wherein said at least one storage device comprises said at least one data communication monitor.

108. A method for data backup and recovery for use with at least one server interconnected with at least one storage device, said method comprising:
 providing at least one data recovery device;
  providing at least one data recovery storage device comprising a permanent storage component associated with and controlled by said at least one data recovery device;
  providing at least one data communication monitor operative to perform:
  monitoring the data communication between said at least one server and said at least one storage device;
  creating at least control information bearing an order stamp including an order mark and a time mark regarding said data communications between corresponding ones of said at least one server and said at least one storage device; and
  sending said monitored data communications and said control information to said permanent storage component of said at least one data recovery device, receiving said at least control information by said at least one data recovery device; and
  storing said data on said permanent storage component of said at least one data recovery storage device in parallel and without requiring that the data be received by permanent storage component of said at least one data recovery storage device in a given order before re-ordering the data.

109. A method for data backup and recovery according to claim 108 and wherein at least one of said at least one data communication monitor is located other than at said at least one storage device.

110. A method for data backup and recovery according to claim 109 and wherein said at least one data communication monitor also provides at least part of said data communications to said at least one data recovery device.

111. A method for data backup and recovery according to claim 109 and wherein individual ones of said at least one data communication monitor are associated with individual ones of said at least one server.

112. A method for data backup and recovery according to claim 108 and wherein said at least one data communication monitor also provides at least part of said data communications to said at least one data recovery device.

113. A method for data backup and recovery according to claim 108 and wherein said at least one data recovery device is operative to receive said at least control information and to store data on said at least one data recovery storage device in parallel.

114. A method for data backup and recovery according to claim 108 and wherein said data communications comprise data updates.

115. A method for data backup and recovery according to claim 108 and wherein said reconstruction of a representation of said data communications at a given earlier time guarantees that if the order stamp of a first update is smaller than the order stamp of a second update, the second update is not stored on said at least one data recovery storage device unless the first update is stored on said at least one data recovery storage device.

116. A method for data backup and recovery according to claim 108 and wherein said at least one data communication monitor is associated with network elements of a storage area network.

117. A method for data backup and recovery according to claim 108 and wherein at least one of said control information and said data communications is communicated from said at least one data communication monitor to said at least one data recovery device via a network.

118. A method for data backup and recovery according to claim 117 and wherein said network is a private network.

119. A method for data backup and recovery according to claim 117 and wherein said network is a public network.

120. A method for data backup and recovery according to claim 108 and wherein at least one of said control information and said data communications is communicated from said at least one data communication monitor to said at least one data recovery device via a storage area network.

121. A method for data backup and recovery according to claim 108 and wherein said at least one data communication monitor provides at least part of said data communications to said at least one data recovery storage device other than via said at least one data recovery device.

122. A method for data backup and recovery according to claim 108 and also comprising storing at least control information on at least one LOG storage device, said at least control information bearing a time mark regarding data communications between corresponding ones of said at least one server and said at least one storage device via a storage area network.

123. A method for data backup and recovery according to claim 122 and wherein said at least one data communication monitor also stores at least part of said data communications to said at least one LOG storage device.

124. A method for data backup and recovery according to claim 123 and wherein said data communications stored to said at least one LOG storage device comprise data updates sent by said at least one server to said at least one storage device.

125. A method for data backup and recovery according to claim 124 having said at least one LOG storage device such that if either said control information or said data communications or both are prematurely erased from said at least one data recovery device due to a failure or other event, said at least one data recovery device restores either said control information or said data communications or both from said at least one LOG storage device.

126. A method for data backup and recovery according to claim 125 wherein said at least one data recovery device resumes its activities with said control information or said data communications or both restored from said at least one LOG storage device.

127. A method for data backup and recovery according to claim 125 and wherein said at least part of said data communications is communicated from said at least one data communication monitor to said at least one LOG storage device via a network.

128. A method for data backup and recovery according to claim 127 and wherein said network is a private network.

129. A method for data backup and recovery according to claim 127 and wherein said network is a public network.

130. A method for data backup and recovery according to claim 125 and wherein at least part of said data communications is communicated from said at least one data communication monitor to said at least one LOG storage device via said storage area network.

131. A method for data backup and recovery according to claim 124 wherein said at least one data recovery device retrieves said at least part of said data communications from at least one LOG storage device for the purpose of storing said data to at least one data recovery storage device associated therewith in a time ordered manner.

132. A method for data backup and recovery according to claim 124 wherein said at least one data recovery device retrieves both said control information and said at least part of said data communications from at least one LOG storage device for the purpose of storing said data to at least one data recovery storage device associated therewith in a time ordered manner.

133. A method for data backup and recovery according to claim 132 and wherein both said control information and said at least part of said data communications are communicated from said at least one data communication monitor to said at least one LOG storage device via a network.

134. A method for data backup and recovery according to claim 133 and wherein said network is a private network.

135. A method for data backup and recovery according to claim 133 and wherein said network is a public network.

136. A method for data backup and recovery according to claim 132 and wherein both said control information and said at least part of said data communications are communicated from said at least one data communication monitor to said at least one LOG storage device via said storage area network.

* * * * *